US008275649B2

(12) United States Patent
Zheng et al.

(10) Patent No.: US 8,275,649 B2
(45) Date of Patent: Sep. 25, 2012

(54) MINING LIFE PATTERN BASED ON LOCATION HISTORY

(75) Inventors: Yu Zheng, Beijing (CN); Yang Ye, Beijing (CN); Xing Xie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 12/562,588

(22) Filed: Sep. 18, 2009

(65) Prior Publication Data

US 2011/0071881 A1    Mar. 24, 2011

(51) Int. Cl.
*G06Q 30/00* (2012.01)
(52) U.S. Cl. ............ 705/7.34; 705/7.29; 705/7.31
(58) Field of Classification Search ............ 705/7.29, 705/7.31, 7.34
See application file for complete search history.

(56) References Cited

U.S. PATENT DOCUMENTS

| | | |
|---|---|---|
| 6,023,241 A | 2/2000 | Clapper |
| 6,091,359 A | 7/2000 | Geier |
| 6,385,539 B1 | 5/2002 | Wilson et al. |
| 6,496,814 B1 | 12/2002 | Busche |
| 6,611,881 B1 | 8/2003 | Gottfurcht et al. |
| 6,816,779 B2 | 11/2004 | Chen et al. |
| 6,904,160 B2 | 6/2005 | Burgess |
| 7,155,456 B2 | 12/2006 | Abbott, III et al. |
| 7,233,861 B2 * | 6/2007 | Van Buer et al. ........... 701/209 |
| 7,349,768 B2 | 3/2008 | Bruce et al. |
| 7,366,726 B2 | 4/2008 | Bellamy et al. |
| 7,395,250 B1 | 7/2008 | Aggarwal et al. |
| 7,437,239 B2 | 10/2008 | Serre |
| 7,447,588 B1 | 11/2008 | Xu et al. |
| 7,479,897 B2 | 1/2009 | Gertsch et al. |
| 7,548,936 B2 | 6/2009 | Liu et al. |
| 7,561,959 B2 | 7/2009 | Hopkins et al. |
| 7,584,159 B1 | 9/2009 | Chakrabarti et al. |
| 7,603,233 B2 | 10/2009 | Tashiro |
| 7,610,151 B2 | 10/2009 | Letchner et al. |
| 7,660,441 B2 | 2/2010 | Chen et al. |
| 7,706,964 B2 | 4/2010 | Horvitz et al. |
| 7,739,040 B2 | 6/2010 | Horvitz |
| 7,904,530 B2 | 3/2011 | Partridge et al. |
| 7,948,400 B2 | 5/2011 | Horvitz |
| 7,984,006 B2 | 7/2011 | Price |

(Continued)

FOREIGN PATENT DOCUMENTS

WO    WO2006097907 A2    9/2006

(Continued)

OTHER PUBLICATIONS

Harihan and Toyama, Project Lachesis: Parsing and Modeling Location Histories, GIScience 2004, LNCS 3234, 2004, p. 106-124.*

(Continued)

*Primary Examiner* — Justin M Pats
(74) *Attorney, Agent, or Firm* — Lee & Hayes, PLLC

(57) ABSTRACT

Techniques for providing mining life pattern are described. This disclosure describes mining a life pattern of an individual, for example, by identifying places visited during the individual's daily activities. Mining the individual life pattern includes collecting location data for the individual and predicting behaviors and preferences of the individual based at least in part on a location history. The location history of the individual is represented with a sequence of geographical regions that have been visited by the individual with corresponding arrival and departure times for each region. Once the life pattern is predicted from the location history, information is recommended to the individual based at least in part on the life pattern.

18 Claims, 8 Drawing Sheets

U.S. PATENT DOCUMENTS

| | | | |
|---|---|---|---|
| 8,060,462 | B2 | 11/2011 | Flinn et al. |
| 8,117,138 | B2 | 2/2012 | Apte et al. |
| 2002/0032689 | A1 | 3/2002 | Abbott, III et al. |
| 2002/0044690 | A1 | 4/2002 | Burgess |
| 2002/0077749 | A1 | 6/2002 | Doi |
| 2003/0063133 | A1 | 4/2003 | Foote et al. |
| 2003/0069893 | A1 | 4/2003 | Kanai et al. |
| 2004/0198386 | A1 | 10/2004 | Dupray |
| 2004/0217884 | A1 | 11/2004 | Samadani et al. |
| 2005/0004903 | A1 | 1/2005 | Tsuda |
| 2005/0031296 | A1 | 2/2005 | Grosvenor |
| 2005/0075116 | A1 | 4/2005 | Laird et al. |
| 2005/0075782 | A1 | 4/2005 | Torgunrud |
| 2005/0108261 | A1 | 5/2005 | Glassy et al. |
| 2005/0278371 | A1 | 12/2005 | Funk et al. |
| 2006/0090122 | A1 | 4/2006 | Pyhalammi et al. |
| 2006/0095540 | A1 | 5/2006 | Anderson et al. |
| 2006/0101377 | A1* | 5/2006 | Toyama et al. ............... 717/104 |
| 2006/0156209 | A1 | 7/2006 | Matsuura et al. |
| 2006/0251292 | A1 | 11/2006 | Gokturk et al. |
| 2006/0266830 | A1 | 11/2006 | Horozov et al. |
| 2007/0005419 | A1* | 1/2007 | Horvitz et al. ................. 705/14 |
| 2007/0064633 | A1 | 3/2007 | Fricke |
| 2007/0127833 | A1 | 6/2007 | Singh |
| 2007/0226004 | A1 | 9/2007 | Harrison |
| 2008/0016051 | A1 | 1/2008 | Schiller |
| 2008/0076451 | A1 | 3/2008 | Sheha et al. |
| 2008/0201074 | A1 | 8/2008 | Bleckman et al. |
| 2008/0215237 | A1* | 9/2008 | Perry ............................ 701/209 |
| 2008/0319660 | A1 | 12/2008 | Horvitz et al. |
| 2008/0319974 | A1 | 12/2008 | Ma et al. |
| 2009/0063646 | A1 | 3/2009 | Mitnick |
| 2009/0083128 | A1 | 3/2009 | Siegel |
| 2009/0138188 | A1 | 5/2009 | Kores et al. |
| 2009/0216435 | A1* | 8/2009 | Zheng et al. .................. 701/209 |
| 2009/0216704 | A1 | 8/2009 | Zheng et al. |
| 2009/0228198 | A1 | 9/2009 | Goldberg et al. |
| 2009/0239552 | A1 | 9/2009 | Churchill et al. |
| 2010/0004997 | A1 | 1/2010 | Mehta et al. |
| 2010/0070171 | A1 | 3/2010 | Barbeau et al. |
| 2010/0076968 | A1 | 3/2010 | Boyns et al. |
| 2010/0082611 | A1 | 4/2010 | Athsani et al. |
| 2011/0029224 | A1 | 2/2011 | Chapman et al. |
| 2011/0130947 | A1 | 6/2011 | Basir |
| 2011/0184949 | A1 | 7/2011 | Luo |
| 2011/0280453 | A1 | 11/2011 | Chen et al. |

FOREIGN PATENT DOCUMENTS

| | | | |
|---|---|---|---|
| WO | WO2009053411 | A1 | 4/2009 |

OTHER PUBLICATIONS

Zheng et al., Learning Transportation Mode from Raw GPS Data for Geographic Applications on the Web, WWW 2008, Apr. 21-25, 2008, Beijing, China, p. 247-256.*

Ahern et al., World Explorer: Visualizing Aggregate Data from Unstructured Text in Geo-Referenced Collections, JCDL '07, Jun. 17-22, 2007, p. 1-10.*

Zheng et al., GeoLife: Managing and Understanding Your Past Life over Maps, The Ninth International Conference on Mobile Data Management, 2008, p. 211-212.*

Graham, GPS gadgets can reveal more than your location, newscientist.com, Jun. 3, 2008, p. 1-2.*

Schofield, It's GeoLife, Jim, but not as we know it, The Guardian, Mar. 13, 2008, p. 1-2.*

Zheng et al., Searching Your Life on Web Maps, 2008, p. 1-4.*

Takeuchi and Sugimoto, CityVoyager: An Outdoor Recommendation System Based on User Location History, UIC 2006, p. 624-636.*

Horozov et al., Using location for personalized POI recommendations in mobile environments, 2006, p. 1-6.*

Ziebart et al., Navigate Like a Cabbie: Probabilistic Reasoning from Observed Context-Aware Behavior, UBiComp '08, Sep. 21-24, 2008, Seoul, Korea, p. 1-10.*

Aizawa et al., Capture and Efficient Retrieval of Life Log, 2004, p. 1-6.*

Schönfelder, Between routines and variety seeking: The characteristics of locational choice in daily travel, 10th International Conference on Travel Behaviour Research, Aug. 10-15, 2003, p. 1-32.*

Adomavicius, Tuzhilin, "Toward the Next Generation of Recommender Systems: A Survey of the State-of-the-Art and Possible Extensions", IEEE Transactions on Knowledge and Data Engineering, vol. 17, No. 6, Jun. 2005, pp. 734-749.

Amato, et al., "Region Based Image Similarity Search Inspired by Text Search", Third Italian Research Conference on Digital Library Systems, Padova, Italy, Jan. 29-30, 2007, pp. 78-85, retrieved from the internet at <<http://www.nmis.isti.cnr.it/amato/papers/ircdI07-1.pdf>>.

Brunato, Battiti, "A Location-Dependent Recommender System for the Web", MobEA Workshop, Budapest, May 2003, pp. 1-5, retrieved on Dec. 29, 2009 at <<http://dit.unitn.it/~brunato/pubblicazioni/MobEA.pdf>>.

Datta, et al., "Image Retrieval: Ideas, Influences, and Trends of the New Age", ACM Computing Suyrveys, vol. 40, No. 2, Article 5, 2008, pp. 1-60, retrieved from the internet at <<http://infolab.stanford.edu/~wangz/project/imsearch/review/JOUR/datta.pdf>>.

Deerwester, et al., "Indexing by Latent Semantic Analysis", J. Amer. Soc. Info. Sci., vol. 41, No. 6, 1990, retrieved from the internet at <<http://citeseerx.ist.psu.edu/viewdoc/download; jsessionid=B056787B1E8B1F013D9FA98930DE10EE?doi=10.1.1.49.7546&rep=rep1&type=pdf>>.

Dubuisson, et al., "A Modified Hausdorff Distance for Object Matching", Proceedings of the 12th IAPR International Conference on Pattern Recognition, Computer Vision & Image Processing, vol. 1, Oct. 9-13, 1994, pp. 566-568, retrieved from the internet at <<http://ieeexplore.ieee.org/stamp/stamp.jsp?tp=&isnumber=12513&arnumber=576361>>.

Eagle, Pentland, "Reality mining: sensing complex social systems", Springer-Verlag London, Personal and Ubiquitous Computing, vol. 10, Issue 4, 2006, pp. 255-268.

Estivill-Castro, Lee, "Data Mining Techniques for Autonomous Exploration of Large Volumes of Geo-referenced Crime Data", 6th International Conference on GeoComputation, University of Queensland, Brisbane, Australia, Sep. 24-26, 2001, pp. 1-12, retrieved on Dec. 29, 2009 at <<http://citeseer.ist.psu.edu/cache/papers/cs/28670/ftp:zSzzSzftp.cs.newcastle.edu.auzSzpubzSztechreportszSztr2001-09.pdf/estivill-castro01data.pdf>>.

Gonzalez, Hidalgo, Barabasi, "Understanding individual human mobility patterns Supplementary Material", Nature, vol. 453, 2008, pp. 779-782, retrieved on Dec. 29, 2009 at <<http://www.barabasilab.com/pubs/CCNR-ALB_Publications/200806-05_Nature-MobilityPatterns/200806-05_Nature-MobilityPatterns-SuppMat13.pdf>>.

Huang, Shekhar, Xiong, "Discovering Co-location Patterns from Spatial Datasets: A General Approach", IEEE Transactions on Knowledge and Data Engineering, vol. 16, Issue 12, Dec. 2004, pp. 1472-1485, retrieved on Dec. 29, 2009 at <<http://www.spatial.cs.umn.edu/paper_ps/coloc-tkde.pdf>>.

Kavouras, et al., "A Method for the Formalization and Integration of Geographic Categorizations", Draft version from the International Journal of Geographic Information Science, vol. 16, No. 5, 2002, pp. 439-453, retrieved from the internet at <<http://ontogeo.ntua.gr/publications/kavouras_kokla_IGIS2002.pdf>>.

Ke, et al., "Correlated Pattern Mining in Quantitative Databases", ACM Transactions on Database Systems, vol. V, No. N, Apr. 2008, pp. 1-44, retrieved from the internet at <<http://www.cse.ust.hk/~wilfred/paper/tods08a.pdf>>.

Ke, et al., "Efficient Correlations Search from Graph Databases", IEEE Transactions on Knowledge and Data Engineering, vol. 20, Issue 12, Dec. 2008, pp. 1601-1615, retrieved from the internet at <<http://www.cse.ust.hk/~wilfred/paper/tkde08a.pdf>>.

Lemire, Maclachlan, "Slope One Predictors for Online Rating-Based Collaborative Filtering", Proceedings of SIAM Data Mining 2005 (SDM'05), Jan. 11, 2005, pp. 1-5, retrieved on Dec. 29, 2009 at <<http://www.daniel-lemire.com/fr/documents/publications/lemiremaclachlan_sdm05.pdf>>.

Mamoulis, Cao, Kollios, Hadjieleftheriou, Tao, Cheung, "Mining, Indexing, and Querying Historical Spatiotemporal Data", Proceedings of the 10th ACM SIGKDD International Conference on Knowledge Discovery and Data Mining Seattle, WA, Aug. 22, 2004, pp. 236-245, retrieved on Dec. 29, 2009 at <<http://i.cs.hku.hk/~nikos/sigkdd2004_1.pdf>>.

Markowetz, et al., "Design and Implementation of a Geographic Search Engine", Eighth International Workshop on the Web Databases (WebDB 2005), Baltimore, MD, Jun. 16-17, 2005, Baltimore, MD, 6 pages, retrieved from the internet at <<http://cis.poly.edu/suel/papers/geo.pdf>>.

Morimoto, "Mining Frequent Neighboring Class Sets in Spatial Databases", Proceedings of the 7th ACM SIGKDD Conference on Knowledge Discovery and Data Mining (KDD), San Francisco, CA, Aug. 26-29, 2001, pp. 353-358.retrieved on Dec. 29, 2009 at <<http://delivery.acm.org/10.1145/510000/502564/p353-morimoto.pdf?key1=502564&key2=1634712621&coll=GUIDE&dI=GUIDE&CFID=70432903&CFTOKEN=93744375>>.

Popivanov, et al., "Similarity Search Over Time-Series Data Using Wavelets", Proceedings of the 18th International Conference on Data Engineering (ICDE'02),IEEE Computer Society, San Jose, CA, Feb. 26-Mar. 1, 2002, 10 pages, retrieved from the internet at <<http://infolab.usc.edu/csci599/Fall2003/Time%20Series/Similarity%20search%20over%20time-series%20data%20using%20wavelets.pdf>>.

Salton, et al., "A Vector Space Model for Automatic Indexing", Communications of the ACM, vol. 187, No. 11, Nov. 1975, pp. 613-620, retrieved from the internet at <<http://portal.acm.org/ft_gateway.cfm?id=361220&type=pdf&coll=Guide&dI=GUIDE&CFID=46278489&CFTOKEN=41877236>>.

Salton, "Dynamic Document Processing", ACM, 1972, pp. 658-668, retrieved from the internet at <<http://portal.acm.org/ft_gateway.cfm?id=361509&type=pdf&coll=GUIDE&dI=GUIDE&CFID=46278306&CFTOKEN=13271377>>.

Takeuchi, Sugimoto, "An Outdoor Recommendation System based on User Location History", Proceedings of the 1st International Workshop on Personalized Context Modeling and Management for Ubicomp Applications (ubiPCMM), Tokyo, Japan, Sep. 11, 2005, pp. 91-100, retrieved on Dec. 29, 2009 at <<http://ftp.informatik.rwth-aachen.de/Publications/CEUR-WS/Vol-149/paper14.pdf>>.

Tsoukatos, et al., "Efficient Mining of Spatiotemporal Patterns", Proceedings of the 7th International Symposium on Spatial and Temporal Databases LNCS 2121, Redondo Beach, CA, Jul. 12-15, 2001, pp. 425-442, retrieved from the internet at <<http://www.springerlink.com/content/4drejf9h52hk7hv7/fulltext.pdf>>.

Xiao, Xie, Luo, Ma, "Density Based Co-Location Pattern Discovery", 16th ACM SIGSPATIAL International Conference on Advances in Geographic Information Systems, Article 29, Irvine, CA, Nov. 5, 2008, pp. 1-10, retrieved on Dec. 29, 2009 at <<http://www.cse.ust.hk/~xiaoxy/pub/gis-08.pdf>>.

Yan, et al., "Feature-based Similarity Search in Graph Structures", ACM Transactions on Database Systems, vol. V, No. N, Jun. 2006, 36 pages, retrieved from the internet at <<http://www.cs.ucsb.edu/~xyan/papers/tods06_similarity.pdf>>.

Zhang, Mamoulis, Cheung, Shou, "Fast Mining of Spatial Collocations", Proceedings of the 10th ACM SIGKDD International Conference on Knowledge Discovery and Data Mining, Seattle, WA, Aug. 22-25, 2004, pp. 384-393, retrieved on Dec. 29, 2009 at <<http://i.cs.hku.hk/~dcheung/publication/sigkdd2004_2.pdf>>.

Zhang, et al., "Mining Non-Redundant High Order Correlations in Binary Data", International Conference on Very Large Data Bases (VLDB), Aukland, NZ, Aug. 23-28, 2008, pp. 1178-1188, retrieved from the internet at <<http://portal.acm.org/ft_gateway.cfm?id=1453981&type=pdf&coll=GUIDE&dI=GUIDE&CFID=46278833&CFTOKEN=66094017>>.

Zhao, et al., "Searching for Interacting Features", Proceedings of the 20th International Joint Conference on Artificial Intelligence, Hyderabad, India, Jan. 6-12, 2007, pp. 1156-1161, retrieved from the internet at <<http://www.public.asu.edu/~huanliu/papers/ijcai07.pdf>>.

Zheng, Wang, Zhang, Xie, Ma, "GeoLife: Managing and Understanding Your Past Life over Maps", Proceedings of the 9th International Conference on Mobile Data Management, Beijing, China, Apr. 27-30, 2008, pp. 211-212.

Zheng, et al., "GeoLife2.0: A Location-Based Social Networking Service", Proceedings of the 10th International Conference on Mobile Data Management (MDM 2009), Taipei, Taiwan, May, 2009, 2 pages, retrieved from the internet at <<http://research.microsoft.com/pubs/79441/GeoLife2.0%20A%20Location-Based%20Social%20Networking%20Service.pdf>>.

Zheng, Liu, Wang, Xie, "Learning Transportation Mode from Raw GPS Data for Geographic Applications on the Web", Proceedings of the 17th International Conference on World Wide Web, Beijing, China, Apr. 21, 2008, pp. 247-256, retrieved on Dec. 29, 2009 at <<http://delivery.acm.org/10.1145/1370000/1367532/p247-zheng.pdf?key1=1367532&key2=0674712621&coll=GUIDE&dI=GUIDE&CFID=68817993&CFTOKEN=12068153>>.

Zheng, Li, Chen, Xie, Ma, "Understanding Mobility Based on GPS Data", ACM Proceedings of Conference on Ubiquitous Computing (UbiComp), vol. 344, Seoul, South Korea, Sep. 21-24, 2008, pp. 312-321, retrieved on Dec. 29, 2009 at <<http://delivery.acm.org/10.1145/1410000/1409677/p312-zheng.pdf?key1=1409677&key2=0364712621&coll=GUIDE&dI=GUIDE&CFID=70433597& CFTOKEN=93582958>>.

Abowd et al., "Cyberguide: A mobile context-aware tour guide", Wireless Networks, vol. 3, retrieved on Apr. 30, 2010 at <<http://graphics.cs.columbia.edu/courses/mobwear/resources/p421-abowd-97.pdf>>, Oct. 1997, pp. 421-433.

Aizawa, et al., "Capture and Efficient Retrieval of Life Log", available at least as early as Nov. 16, 2007, at <<http://www.ii.ist.i.kyoto-u.ac.jp/~sumi/pervasive04/program/Aizawa.pdf>>, In Pervasive 2004 Workshop on Memory and Sharing of Experiences, Apr. 2004, 6 pgs.

Aizawa, "Digitizing Personal Experiences: Capture and Retrieval of Life Log", at <<http://ieeexplore.ieee.org/iel5/9520/30168/01385968.pdf?arnumber=1385968 >>, Proceedings of the 11th International Multimedia Modelling Conference (MMM'05), Jan. 2005, pp. 1 (abstract).

Allen, "Dredging-up the Past: Lifelogging, Memory and Surveillance", retrieved at <<http://lsr.nellco.org/cgi/viewcontent.cgi?article=1177&context=upenn/wps>>, University of Pennsylvania Law School, 2007, pp. 50.

Ankerst et al., "OPTICS: Ordering Points to Identify the Clustering Structure", Proceedings of the ACM SIGMOD 1999 International Conference on Management of Data, Philadelphia, Pennsylvania, retrieved Apr. 30, 2010 at <<http://www.dbs.informatik.uni-muenchen.de/Publicationen/Papers/OPTICS.pdf>>, Jun. 1-3, 1999, 12 pages.

Belussi, et al, "Estimating the Selectivity of Spatial Queries Using the 'Correlation' Fractal Dimension", retrieved on Apr. 15, 2010 at <<http://www.vldb.org/conf/1995/P299.PDF>>, Proceedings of Conference on Very Large Data Bases (VLDB), Sep. 1995, pp. 299-310.

"Bikely Reviews", website, 2010, 1 page, retrieved on Apr. 16, 2010 at <<http://www.bikely.com/>>.

bing.com, Maps, Retrieved on Dec. 28, 2009 at <<http://cn.bing.com/ditu/>>, 2 pgs.

Bohm, "A Cost Model for Query Processing in High Dimensional Data Spaces", retrieved on Apr. 15, 2010 at <<http://www.dbsinformatik.uni-muenchen.de/~boehm/publications/tods-modeling.final.pdf>>, ACM Transactions on Database Systems, Jun. 2000, pp. 1-43.

Brakatsoulas, et al., "On Map-Matching Vehicle Tracking Data", VLDB Endowment, in the Proceedings of the 31st International Conference on Very Large Data Bases, Sep. 2005, pp. 853-864.

Cai, "Indexing Spatio-Temporal Trajectories with Chebyshev Polynomials", retrieved on Apr. 15, 2010 at <<http://www.cs.ubc.ca/~rng/psdepository/sigmod2004.pdf>>, ACM, Conference on Management of Data, Jun. 13-18, 2004, pp. 599-610.

Chan, et al, "Efficient Time Series Matching by Wavelets", retrieved on Apr. 15, 2010 at <<http://infolab.usc.edu/csci599/Fall2003/Time%20Series/Efficient%20Time%20Series%20Matching%20by%20Wavelets.pdf>>, IEEE Computer Society, Proceedings of Conference on Data Engineering (ICDE), Mar. 1999, pp. 126-133.

Chawathe, "Segment-Based Map Matching", In the Proceedings of the IEEE Intelligent Vehicles Symposium, Jun. 13-15, 2007, pp. 1190-1197.

Chen et al., "GeoTV: Navigating Geocoded RSS to Create an IPTV Experience", Proceedings of the 16th International World Wide Web Conference (WWW 2007), Banff, Alberta, Canada, May 8-12, 2007, pp. 1323-1324, retrieved Apr. 30, 2010 at <<http://www2007.org/posters/poster1042.pdf>>.

Chen, et al, "On the Marriage of Lp-norms and Edit Distance", retrieved on Apr. 15, 2010 at <<http://www.google.co.in/url?sa=t&source=web&ct=res&cd=3&ved=0CBEQFjAC&url=http%3A%2Fciteseerx.ist.psu.edu%2Fviewdoc%2Fdownload%3Fdoi%3D10.1.1.1.7443%26rep%3Drep1%26type%3Dpdf&rct=j&q=On+the+marriage+of+lp-norms+and+edit+distance&ei=_ezGS62IE439__Aa1qIzZDA&usg=AFQjCNHFZScVkE4uy1b_oC-Pr4ur7KIBdQ>>, Proceedings of Conference on Very Large Data Bases (VLDB), Aug. 29-Sep. 3, 2004, pp. 792-803.

Chen, et al, "Robust and Fast Similarity Search for Moving Object Trajectories", retrieved on Apr. 15, 2010 at <<http://citeseerx.ist.psu.edu/viewdoc/download;jsessionid=2C0EAC347F5F144727996F29CEFD49FB?doi=10.1.1.94.8191&rep=rep1&type=pdf>>, ACM, Conference on Management of Data, Jun. 2005, pp. 491-502.

Chen et al., "Searching Trajectories by Locations—An Efficiency Study", 2010 Microsoft Research, to be presented at the ACM Conference on Management of Data (SIGMOD), Indianapolis, Indiana, Jun. 6-11, 2010, 12 pages, retrieved on Apr. 16, 2010 at <<http://www.itee.uq.edu.au/~zxf/_papers/sigmod299-chen.pdf>>.

Ding et al, "Querying and Mining of Time Series Data: Experimental Comparison of Representations and Distance Measures", retrieved on Apr. 15, 2010 at <<http://www.vldb.org/pvldb/1/1454226.pdf>>, VLDB Endowment, PVLDB'08, Aug. 23-28, 2008, pp. 1542-1552.

Faloutsos et al, "Fast Subsequence Matching in Time-Series Databases," Proceedings of the 1994 ACM SIGMOD International Conference on Management of Data , vol. 23, No. 2, Jun. 1994, 11 pgs.

Frentzos et al, "Algorithms for Nearest Neighbor Search on Moving Object Trajectories", retrieved on Apr. 15, 2010 at <<http://infolab.cs.unipi.gr/pubs/journals/FGPT06-Geoinformatica.pdf>>, Kluwer Academic Publishers, Geoinformatica, vol. 11, No. 2, Jun. 2007, pp. 1-32.

Frentzos et al, "Index-based Most Similar Trajectory Search", retrieved on Apr. 15, 2010 at <<http://isl.cs.unipi.gr/pubs/TR/UNIPI-ISL-TR-2006-01.pdf>>, IEEE Conference on Data Engineering (Technical Report UNIPI-ISL-TR-2006-01), Jun. 2006, pp. 1-12.

Goldberg, et al., "Computing the Shortest Path: A Search Meets Graph Theory", SODA'05 Proceedings of the Sixteenth Annual ACM-SIAM Symposium on Discrete Algorithms, Jan. 2005, pp. 156-165, 10 pgs.

Gonzalez, et al., "Adaptive Fastest Path Computation on a Road Network: A Traffic Mining Approach", ACM, In the Proceedings of the 33rd International Conference on Very Large Data Bases, Sep. 23-28, 2007, pp. 794-805.

"GPS Track Route Exchange Forum", 2010 GPSXchange.com website, 3 pages, retrieved on Apr. 16, 2010 at <<http://www.gpsxchange.com/phpBB2/index.php>>.

"GPS-Waypoints", retrieved on Apr. 15, 2010 at <<http://www.gps-waypoints.net/>>, 2010, pp. 1.

Greenfeld, "Matching GPS Observations to Locations on a Digital Map", In the Proceedings of the 81st Annual Meeting of the Transportation Research Board, Washington DC, Jan. 2002, 13 pgs.

Gutman, "Reach-Based Routing: A New Approach to Shortest Path Algorithms Optimized for Road Networks", In the Proceedings of the Sixth Workshop on Algorithm Engineering and Experiments and the First Workshop on Analytic Algorithmics and Combinatorics, New Orleans, LA, USA, Jan. 10, 2004, 12 pgs.

Guttman, "R-Trees: A Dynamic Index Structure for Spatial Searching", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fviewdoc%2Fdownload%3Fdoi%3D10.1.1.66.1675%26rep%3Drep1%26type%3Dpdf&rct=j&q=R-trees%3A+a+dynamic+index+structure+for+spatial+searching&ei=JfTGS6uRPJH0__AaCpICHDQ&usg=AFQjCNFtQttNVHCKYJQZcH052-KmCxIZ0g>>, ACM, Proceedings of Conference on Management of Data,1984, pp. 47-57.

Hart, et al., "A Formal Basis for the Heuristic Determination of Minimum Cost Paths", In the Proceedings of IEEE Transactions of Systems Science and Cybernetics, vol. 4, No. 2, Feb. 12, 2007 (First Publication 1968), pp. 100-107.

Hjaltason, Samet, "Distance Browsing in Spatial Databases", retrieved on Apr. 15, 2010 at <<http://citeseerx.ist.psu.edu/viewdoc/download?doi=10.1.1.25.4224&rep=rep1&type=pdf>>, ACM Transactions on Database Systems, vol. 24, No. 2, Jun. 1999, pp. 265-318.

Horozov et al., "Using Location for Personalized POI Recommendations in Mobile Environments", Proceedings of the 2006 International Symposium on Applications and the Internet (SAINT 2006), Phoenix, Arizona, Jan. 23-27, 2006, pp. 124-129.

Huang, et al., "Project Report (draft version) Spatial Outlier Detection", retrieved on Dec. 12, 2008 at <<http://www-users.cs.umn.edu/~joh/csci8715/P6.pdf>>, Computer Science Department, University of Minnesota, 2004, pp. 1-8.

Jan, Horowitz, Peng, "Using GPS Data to Understand Variations in Path Choice", retrieved on Apr. 15, 2010 at <<https://pantherfile.uwm.edu/horowitz/www/pathchoice.pdf>>, National Research Council, Transportation Research Record 1725, 2000, pp. 37-44.

Jing, et al., "Hierarchical Optimization of Optimal Path Finding for Transportation Applications", (University of Michigan Research Paper, 1996, pp. 269-276) In the Proceedings of the Fifth International Conference on Informaton and Knowledge Management, 1996, pp. 261-268.

Kanoulas, Du, Xia, Zhang, "Finding Fastest Paths on a Road Network with Speed Patterns", retrieved on Dec. 24, 2009 at <<http://www.inf.unibz.it/dis/teaching/SDB/paper/kanoulasDXZ_icde06_fastestpath.pdf>>, IEEE Computer Society, Proceedings of Conference on Data Engineering (ICDE), 2006, pp. 1-10.

Kharrat, Popa, Zeitouni, Faiz, "Clustering Algorithm for Network Constraint Trajectories", retrieved on Apr. 15, 2010 at <<http://www.prism.uvsq.fr/~karima/papers/SDH_08.pdf>>, Springer Berlin, Symposium on Spatial Data Handling (SDH), 2008, pp. 631-647.

Korn, Pagel, Faloutsos, "On the 'Dimensionality Curse' and the 'Self-Similarity Blessing'", retrieved on Apr. 15, 2010 at <<http://www.informedia.cs.cmu.edu/documents/korn_dimcurse_2001.pdf>>, IEEE Educational Activities Department, Transactions on Knowledge and Data Engineering, vol. 13, No. 1, Jan. 2001, pp. 96-111.

Kou, et al., "Spatial Weighted Outlier Detection", retrieved on Dec. 12, 2008 at <<http://www.siam.org/proceedings/datamining/2006/dm06_072kouy.pdf>>, SIAM Conference on Data Mining, 2006, pp. 614-618.

Lavondes, et al., "Geo::PostalAddress—Country-specific postal address parsing/formatting", retrieved on Dec. 16, 2008 at <<http://search.cpan.org/~pauamma/Geo-PostalAddress-0.04/PostalAddress.pm>>, CPAN, 2004, pp. 1-8.

Li, et al. "A Connectivity-Based Map Matching Algorithm", AARS, Asian Journal of Geoinformatics, 2005, vol. 5, No. 3, pp. 69-76.

Li, et al., "Traffic Density-Based Discovery of Hot Routes in Road Networks", Springer-Verlag, Advances in Spatial and Temporal Databases, 2007, pp. 441-459.

Liao, et al., "Learning and Inferring Transportation Routines", Elsevier, Artificial Intelligence, vol. 171, Issues 5-6, Apr. 2007, pp. 311-331.

Liao et al., "Location-based Activity Recognition", Proceedings of the 19th Annual Conference on Neural Information Processing Systems (NIPS-2005), Whistler, British Columbia, Canada, Dec. 5-10, 2005, 8 pages, retrieved on Apr. 16, 2010 at <<http://books.nips.cc/papers/files/nips18/NIPS2005_0773.pdf>>.

Manning et al., "An Introduction to Information Retrieval", DRAFT, Cambridge University Press, Apr. 1, 2009, 581 pages, retrieved on Apr. 16, 2010 at <<http://nlp.stanford.edu/IR-book/pdf/irbookonlinereading.pdf>>.

Masoud, et al., "Fast Algorithms for Outlier Detection", retrieved on Dec. 12, 2008 at <<http://www.scipub.org/fulltext/jcs/jcs42129-132.pdf>>, Journal of Computer Science, vol. 4, No. 2, 2008, pp. 129-132.

McKeown, et al., "Integrating Multiple Data Representations for Spatial Databases", retrieved on Dec. 12, 2008 at <<http://mapcontext.com/autocarto/proceedings/auto-carto-8/pdf/integrating-multiple-data-representations-for-spatial-databases.pdf>>, Auto Carto 8 Conference Proceedings (ASPRS and ACSM), 1987, pp. 754-763.

Miller, "Analysis of Fastest and Shortest Paths in an Urban City Using Live Vehicle Data from a Vehicle-to-Infrastructure Architecture", retrieved on Dec. 24, 2009 at <<http://www.sigmacoding.com/jeff/publications/fastest-path-ifac09.pdf>>, Federation on Automatic Control Symposium on Control in Transportation Systems (IFAC), Sep. 2009, pp. 1-5.

Morse, Patel, "An Efficient and Accurate Method for Evaluating Time Series Similarity", retrieved on Apr. 15, 2010 at <<http://www.eecs.umich.edu/db/files/sigmod07timeseries.pdf>>, ACM, Proceedings of Conference on Management of Data, Jun. 11, 2007, pp. 569-580.

Nicholson, "Finding the Shortest Route Between Two Points in a Network", British Computer Society, The Computer Journal, 1966, vol. 9, No. 3, pp. 275-280.

Park et al., "Location-Based Recommendation System Using Bayesian User's Preference Model in Mobile Devices", J. Indulska et al. (Eds.): UIC 2007, LNCS 4611, pp. 1130-1139, retrieved on Apr. 30, 2010 at <<http://sclab.yonsel.ac.kr/publications/paper/IC/UIC07-MHPark.pdf>>.

Patterson, et al., "Inferring High-Level Behavior from Low-Level Sensors", Springer-Verlag Berlin Heidelberg, Lecture Notes in Computer Science, International Conference on Ubiquitous Computing, 2003, vol. 2864, pp. 73-89.

Pfoser et al., "Novel Approaches in Query Processing for Moving Object Trajectories", Proceedings of the 26th International Conference on Very Large Data Bases (VLDB 2000), Cairo, Egypt, Sep. 10-14, 2000, pp. 395-406.

Pfoser, et al., "Capturing the Uncertainty of Moving-Object Representations", Springer-Verlag, In the Proceedings of the 6th International Symposium on Advances in Spatial Databases, Lecture Notes in Computer Science, 1999, vol. 1651, pp. 111-131.

Quddus, et al."Current Map-Matching Algorithms for Transport Applications: State-of-the-Art and Future Research Directions", Elsevier Ltd., Transportation Research Part C: Emerging Technologies, 2007, vol. 15, Issue 5, pp. 312-328.

Roussopoulos, Kelley, Vincent, "Nearest Neighbor Queries", retrieved on Apr. 15, 2010 at <<http://www.cs.umd.edu/~nick/papers/nncolor.pdf>>, ACM, Presentation: Conference on Management of Data, 1995, pp. 1-23.

Saltenis, "Outlier Detection Based on the Distribution of Distances between Data Points", retrieved on Dec. 12, 2008 at <<http://www.mii.lt/informatica/pdf/INFO558.pdf>>, Informatica, vol. 15, No. 3, 2004, pp. 399-410'.

Schonfelder, "Between Routines and Variety Seeking: The Characteristics of Locational Choice in Daily Travel", retrieved on Dec. 12, 2008 at <<http://www.ivt.ethz.ch/vpl/publications/reports/ab192.pdf>>, 10th International Conference on Travel Behaviour Research, Aug. 10-15, 2003, pp. 1-32.

Sellen, et al., "Do Life-Logging Technologies Support Memory for the Past? an Experimental Study Using SenseCam", available at least as early as Nov 16, 2007, at <<http://research.microsoft.com/sds/papers/ SensecamMemCHICamRdy.pdf>>, pp. 10.

"Share My Routes", retrieved on Apr. 15, 2010 at <<http://www.sharemyroutes.com/>>, 2010, pp. 1-2.

Sherkat, Rafiei, "On Efficiently Searching Trajectories and Archival Data for Historical Similarities", retrieved on Apr. 15, 2010 at <<http://webdocs.cs.ualberta.ca/~drafiei/papers/vldb08.pdf>>, VLDB Endowment, Proceedings of Conference on Very Large Data Bases (VLDB), vol. 1, No. 1, Aug. 24, 2008, pp. 896-908.

Simon, Frohlich, "A Mobile Application Framework for the geospatial Web", retrieved on Apr. 16, 2010 at <<http://www2007.org/papers/paper287.pdf>>, ACM, Proceedings of World Wide Web Conference (WWW), May 8, 2007, pp. 381-390.

Singh et al., "Relational Learning via Collective Matrix Factorization", Proceedings of the 14th ACM SIGKDD International Conference on Knowledge Discovery and Data Mining, Las Vegas, Nevada, Aug. 24-27, 2008, pp. 650-658, retrieved on Apr. 30, 2010 at <<http://www.cs.cmu.edu/-ggordon/CMU-ML-08-109.pdf>>.

Srebro et al., "Weighted Low-Rank Approximations", Proceedings of the 20th International Conference on Machine Learning (ICML-2003), Washington, DC, Aug. 21-24, 2003, 8 pages, retrieved on Apr. 30, 2010 at <<http://people.scail.mit.edu/tommi/papers/SreJaa-icml03.pdf>>.

Takeuchi et al., "CityVoyager: An Outdoor Recommendation System Based on User Location History", Proceedings of the 3rd International Conference on Ubiquitous Intelligence and Couputing (UIC 2006), Wuhan, China, Sep. 3-6, 2006, pp. 625-636.

Taylor, et al., "Virtual Differential GPS & Road Reduction Filtering by Map Matching", In the Proceedings of ION'99, Twelfth International Technical Meeting of the Satellite Division of the Institute of Navigation, 1999, pp. 1675-1684.

Vlachos, Kollios, Gunopulos, "Discovering Similar Multidimensional Trajectories", retrieved on Apr. 15, 2010 at <<http://www.google.co.in/url?sa=t&source=web&ct=res&cd=1& ved=0CAcQFjAA&url=http%3A%2F%2Fciteseerx.ist.psu. edu%2Fviewdoc%2Fdownload%3Fdoi%3D10.1.1.106. 1984%26rep%3Drep1%26type%3Dpdf&rct=j& q=Discovering+similar+multidimensional+trajectories& ei=ivfGS6HCM4uj_ga3wOiBDQ&usg=AFQjCNG20j6K3s_ WuY-VhWeDjIPYpgxv1Q>>, IEEE Computer Society, Proceedings of Conference on Data Engineering (ICDE), 2002, pp. 673-684.

Wang et al., "An Optimized Location-based Mobile Restaurant Recommend and Navigation System", WSEAS Transactions on Information Science and Applications, vol. 6, Issue 5, May 2009, pp. 809-818, retrieved on Apr. 16, 2010 at <<http://www.wseas.us/e-library/transactions/information/2009/29-186.pdf>>.

Wang et al., "Unifying User-based adn Item-based Collaborative Filtering Approaches by Similarity Fusion", Proceedings of the 29th Annual International ACM SIGIR Conference on Research and Development in Information Retrieval, Seattle, Washington, Aug. 6-11, 2006, pp. 501-508, retrieved on Apr. 30, 2010 at <<http://ict.ewi.tudelft.nl/pub/jun/sigir06_similarityfuson.pdf>>.

Ward et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, 7 pages, retrieved Apr. 30, 2010 at <<http://www.cs.dartmouth,edu/-tanzeem/pubs/AAA1051WyattD.pdf>>.

Winogard, "Dynamic Cartograms for Navigating Geo-referenced Photographs", available at least as early as Nov 16, 2007, at <<http://cs.stanford.edu/research/project.php?id=289>>, pp. 2.

Xie, Zheng, "GeoLife: Building social networks using human location history", retrieved on Apr. 15, 2010 at <<http://research.microsoft.com/en-us/projects/geolife/>>, Microsoft Corporation, 2010, pp. 1-8.

Xue, "Efficient Similarity Search in Sequence Databases", retrieved on Apr. 15, 2010 at <<http://www.cs.uwaterloo.ca/~david/cs848/presentation-similarity-fengxue.pdf>>, University of Waterloo, Ontario Canada, Course Paper: CS 860 Topics in Database Systems, Nov. 18, 2009, pp. 1-7.

Yi, Jagadish, Faloutsos, "Efficient Retrieval of Similar Time Sequences under Time Warping", 14th International Conference on Data Engineering, Feb. 23-27, 1998, p. 201-208.

Zheng et al., "Collaborative Filtering Meets Mobile Recommendation: A User-centered Approach", to be presented at the Association for the Advancement of Artificial Intelligence (AAAI) 24th Conference on Artificial Intelligence, Atlanta, Georgia, Jul. 11-15, 2010, 6 pages, retrieved on Apr. 16, 2010 at <<http://research.microsoft.com/pubs/122244/AAAI10-Collaborative%20Filtering%20Meets%20Mobile%20 Recommendation%20A%20User-centered%20Approach.pdf>>.

Zheng, et al., "GeoLife: Managing and Understanding Your Past Life over Maps", IEEE Computer Society, In The Proceedings of the Ninth International Conference on Mobile Data Management, 2008, pp. 211-212, 2 pgs.

Zheng et al., "Joint Learning User's Activities and Profiles from GPS Data", ACM Geographic Information Systems Workshop on Location Based Social Networks (ACM LBSN 2009), Seattle, Washington, Nov. 3, 2009, pp. 17-20, retrieved on Apr. 16, 2010 at <<http://delivery.acm.org/10.1145/1630000/1629894/p17-zheng.pdf?key1=1629894&key2=6324041721&coll=GUIDE&dI=GUIDE&CFID=86381688&CFTOKEN=49903381>>.

Zheng et al., "Microsoft GeoLife Project, GeoLife: Building social networks using human location history", Microsoft Research, 2009, 4 pages, retrieved on Apr. 16, 2010 at <<http://research.microsoft.com/en-us/projects/geolife/default.aspx>>.

Zheng et al., "Recommending Friends and Locations Based on Individual Location History", ACM Trans. Asian Language Information Processing, vol. 6, No. 3, Article 9, Ch. 45, Nov. 2007, 47 pages, retrieved on Apr. 16, 2010 at <<http://research.microsoft.com/pubs/122435/Recommending%20friends%20and%20locations%20based%20on%20individual%20location%20history.pdf>>.

Agrawal, et al., "Mining Association Rules between Sets of Items in Large Databases", retrieved on Aug. 4, 2009 at <<http://rakesh.agrawal-family.com/papers/sigmod93assoc.pdf>>, ACM, Proceedings of SIGMOD 1993, 1993, pp. 207-216.

Agrawal, et al., "Mining Sequential Patterns", retrieved on Aug. 4, 2009 at <<http://www.almaden.ibm.com/cs/projects/iis/hdb/Publications/papers/icde95.ps.gz>>, Proceedings of ICDE 1995, 1995, pp. 3-14.

Cao, et al., "Mining Frequent Spatio-temporal Sequential Patterns", retrieved on Aug. 4, 2009 at <<http://i.cs.hku.hk/~nikos/icdm05.pdf>>, IEEE Computer Society, ICDM 2005, 2005, pp. 82-89.

Giannotti, et al., "Efficient Mining of Temporally Annotated Sequences", retrieved on Aug. 4, 2009 at <<http://www.siam.org/meetings/sdm06/proceedings/032giannottif.pdf>>, Proceedings of the Sixth SIAM Intl Conference on Data Mining, 2006, pp. 346-357.

Giannotti, et al., "Trajectory Pattern Mining", retrieved on Aug. 4, 2009 at <<http://cs.gmu.edu/~jessica/temp/p330-giannotti.pdf>>, ACM, KDD 2007, 2007, pp. 330-339.

Gustavsen, "Condor—an application framework for mobility-based context-aware applications", retrieved on Aug. 4, 2009 at <<http://www.comp.lancs.ac.uk/~dixa/conf/ubicomp2002-models/pdf/Gustavsen-goteborg%20sept-02.pdf>>, UBICOMP 2002, 2002, pp. 1-6.

Han, et al., "Frequent pattern mining: current status and future directions", retrieved on Aug. 4, 2009 at <<http://www.springerlink.com/content/9p5633hm18x55867/fulltext.pdf>>, Springer Science+Business Media, LLC, 2007, pp. 55-86.

Krumm, et al., "LOCADIO: Inferring Motion and Location from Wi-Fi Signal Strengths", retrieved on Aug. 4, 2009 at <<http://research.microsoft.com/en-us/um/people/horvitz/locadio.pdf>>, Proceedings of Mobiquitous 2004, 2004, pp. 4-13.

Krumm, et al., "Predestination: Inferring Destinations from Partial Trajectories", retrieved on Aug. 4, 2009 at <<http://research.microsoft.com/en-us/um/people/horvitz/predestination.pdf>>, UBICOMP 2006, 2006, pp. 1-18.

Krumm, et al., "Predestination: Where Do You Want to Go Today?", retrieved on Aug. 4, 2009 at <<http://research.microsoft.com/en-us/um/people/horvitz/predestination-ieee.pdf>>, IEEE Computer Magazine, vol. 40, No. 4, Apr. 2007, pp. 105-107.

Lee, et al., "TraClass: Trajectory Classification Using Hierarchical Region-Based and Trajectory-Based Clustering", retrieved on Aug. 4, 2009 at <<http://www.cs.uiuc.edu/homes/hanj/pdf/vldb08_jglee.pdf>>, ACM, VLDB 2008, vol. 1, Issue 1, 2008, pp. 1081-1094.

Lee, et al., "Trajectory Clustering: A Partition-and-Group Framework", retrieved on Aug. 4, 2009 at <<http://www.cs.uiuc.edu/homes/hanj/pdf/sigmod07_jglee.pdf>>, ACM, SIGMOD 2007, 2007, pp. 1-12.

Lee, et al., "Trajectory Outlier Detection: A Partition-and-Detect Framework", retrieved on Aug. 4, 2009 at <<http://www.cs.uiuc.edu/homes/hanj/pdf/icde08_jaegil_lee.pdf>>, IEEE Computer Society, ICDE 2008, 2008, pp. 1-10.

Li, et al., "Mining User Similarity Based on Location History", retrieved on Aug. 4, 2009 at <<http://portal.acm.org/ft_gateway.cfm?id=1463477&type=pdf&coll=GUIDE&dI=GUIDE&CFID=47485690&CFTOKEN=55940484>>, ACM, GIS 2008, pp. 1-10.

Liao, et al., "Building Personal Maps from GPS Data", retrieved on Aug. 4, 2009 at <<http://luci.ics.uci.edu/predeployment/websiteContent/weAreLuci/biographies/faculty/djp3/LocalCopy/JR-004.pdf>>, Proceedings of IJCAI MOO 2005, 2005, pp. 249-265.

Liao, et al., "Learning and Inferring Transportation Routines", retrieved on Aug. 4, 2009 at <<http://www.cs.rochester.edu/u/kautz/papers/gps-tracking.pdf>>, American Association for Artificial Intelligence, 2004, pp. 1-6.

Miyaki, et al., "Tracking Persons Using Particle Filter Fusing Visual and Wi-Fi Localizations for Widely Distributed Camera", retrieved on Aug. 4, 2009 at <<http://ieeexplore.ieee.org/stamp/stamp.jsp?arnumber=04379287>>, IEEE Intl Conference on Image Processing, ICIP 2007, vol. 3, 2007, pp. 225-228.

Monreale, et al., "WhereNext: a Location Predictor on Trajectory Pattern Mining", retrieved Aug. 4, 2009 at <<http://delivery.acm.org/10.1145/1560000/1557091/p637-monreale.pdf?key1=1557091&key2=5182739421&coll=GUIDE&dI=GUIDE&CFID=47499709& CFTOKEN=90308932>>, ACM, KDD 2009, 2009, pp. 637-645.

Patterson, et al., "Inferring High-Level Behavior from Low-Level Sensors", retrieved on Aug. 4, 2009 at <<http://www.cs.rochester.edu/u/kautz/papers/High-Level-140.pdf>>, UBICOMP 2003, 2003, pp. 1-18.

Rekimoto, et al., "LifeTag: WiFi-based Continuous Location Logging for Life Pattern Analysis", retrieved on Aug. 4, 2009 at <<http://209.85.229.132/search?q=cache:fCil8hzKWxQJ:www.sonycsl.co.jp/person/rekimoto/papers/loca07.pdf+mining+individual+life+pattern+based+on+location+history&cd=5&hl=en&ct=clnk&gl=uk>>, LoCA 2007, 2007, pp. 35-49.

Sohn, et al., "Mobility Detection Using Everyday GSM Traces", retrieved on Aug. 4, 2009 at <<http://www.placelab.org/publications/pubs/mobility-ubicomp2006.pdf>>, UBICOMP 2006, 2006, pp. 212-224.

Wang, et al., "Closet+: Searching for the Best Strategies for Mining Frequent Closed Itemsets", retrieved on Aug. 4, 2009 at <<http://www.cs.umd.edu/~samir/498/wang03closet.pdf>>, ACM, SIGKDD 2003, 2003, pp. 236-245.

Yan, et al., "Clospan: Mining Closed Sequential Patterns in Large Datasets", retrieved on Aug. 4, 2009 at <<http://citeseerx.ist.psu.edu/viewdoc/download;jsessionid=AFADA02A222CC497F30CEC7317F6C7A5?doi=10.1.1.12.3538&rep=rep1&type=pdf>>, Proceedings of SIAM Int. Conference on Data Mining, SDM 2003, 2003, pp. 166-177.

Yavas, et al., "A data mining approach for location prediction in mobile environments", retrieved on Aug. 4, 2009 at <<http://www.cs.bilkent.edu.tr/~oulusoy/dke05.pdf>>, Elsevier B.V., 2004, pp. 121-146.

Zheng, et al., "Mining Interesting Locations and Travel Sequences from GPS Trajectories", retrieved on Aug. 4, 2009 at <<http://www2009.eprints.org/80/1/p791.pdf>>, ACM, WWW 2009, 2009, pp. 791-800.

Borzsonyi, et al., The Skyline Operator, In Proc. ICDE 2001, IEEE Press: 421-430, <<http://ieeexplore.ieee.org/stamp/stamp.jsp?tp=&arnumber=914855>>.

Brauckhoff, et al., Applying PCA for Traffic Anomaly Detection: Problems and Solutions, IEEE, 2009, 5 pages.

Brkic, et al., Generative modeling of spatio-temporal traffic sign trajectories, Proceedings of the IEEE Conference on Computer Vision and Pattern Recognition, 2010, pp. 25-31, <<http://www.zemris.fer.hr/~ssegvic/pubs/brkic10ucvp.pdf>>.

Bu, et al., Efficient Anomaly Monitoring Over Moving Object Trajectory Streams, KDD 2009, ACM, 2009, 9 pages.

Chen, et al., GLS-SOD: A Generalized Local Statistical Approach for Spatial Outlier Detection, Proceedings of KDD 2010, ACM, 2010, pp. 1069-1078.

Cranshaw, et al., Bridging the Gap between the Physical Location and Online Social Networks, In Proc. Ubicomp 2010, ACM Press (2010), <<http://www.eng.tau.ac.il/~eran/papers/Cranshaw_Bridging_the_Gap.pdf>>.

Das, et al., Anomaly Detection and Spatial-Temporal Analysis of Global Climate System, Proceedings of SensorKDD 2009, 9 pages, 2009 ACM.

Eagle, et al., Community Computing: Comparisons between Rural and Urban Societies using Mobile Phone Data, IEEE Social Computing, 144-150, <<http://reality.media.mit.edu/pdfs/Eagle__community.pdf>>.

Eagle, et al., Reality mining: sensing complex social systems. Personal Ubiquitous Computing, 10, 4: 255-268, 2006. <<http://robotics.usc.edu/~sameera/CS546/readings/eagle_uc2006.pdf>>.

Estkowski, No Steiner Point Subdivision Simplification is NP-Complete, In Proceedings of the 10th Canadian Conference on Computational Geometry, pp. 11-20, 1998.

Ge, et al., An Energy-Efficient Mobile Recommender System. In Proc. KDD 2010, ACM Press 2010, <<http://pegasus.rutgers.edu/~kelixiao/papers/An%20Energy-Efficient%20Mobile%20Recommender%20System.pdf>>.

Ge, et al., TOP-EYE: Top-k Evolving Trajectory Outlier Detection, Proceedings of CIKM 2010, Toronto, Canada, 4 pages.

Guehnemann, et al., Monitoring traffic and emissions by floating car data. Institute of transport studies Australia; 2004, <<http://elib.dlr.de/6675/1/its_wp_04-07.pdf>>.

Hirose, et al., Network Anomaly Detection based on Eigen Equation Compression, In Proceedings of the 15th SIGKDD Conference on Knowledge Discovery and Data Mining, pp. 1185-1194, 2009 ACM. <<http://www.ibis.t.u-tokyo.ac.jp/yamanishi/ID361_Network_Anomaly_Detection.pdf>>.

Kindberg, et al., Urban computing. Pervasive computing. IEEE Computer Society. 6, 3, pp. 18-20. Aug. 2007, <<http://ieeexplore.ieee.org/stamp/stamp.jsp?tp=&arnumber=4287439&userType=inst>>.

Kostakos, et al., Urban computing to bridge online and real-world social networks. Handbook of Research on Urban Informatics, 2008, <<http://hci.uma.pt/courses/ubicomp/papers/social/kostakos-08.pdf>>.

Lakhina, et al., Diagnosing Network-Wide Traffic Anomalies, In Proceedings of the SIGCOMM 2004 Conference, 12 pages, 2004 ACM.

Lee, et al., Trajectory Clustering: A Partition-and-group Framework, In Proceedings of the 26th ACM SIGMOD International Conference on Management of Data 2007, pp. 593-604, 2007.

Li, et al., Temporal Outlier Detection in Vehicle Traffic Data, Proceedings of the 2009 IEEE International Conference on Data Engineering, pp. 1319-1322, <<http://www.cs.uiuc.edu/~hanj/pdf/icde09_xli.pdf>>.

Liao, et al., Anomaly Detection in GPS Data Based on Visual Analytics, Proceedings of the 2010 IEEE Symposium, Oct. 2010, pp. 51-58, <<http://web.siat.ac.cn/~baoquan/papers/GPSvas.pdf>>.

Lippi, et al., Collective Traffic Forecasting, Proceedings of the European Conference on Machine Learning and Principles and Practice of Knowledge Discovery Database, ECML PKDD 2010, pp. 259-273, 2010.

Liu, et al., Uncovering cabdrivers' behavior patterns from their digital traces, Computers, Environment and Urban Systems, 2010.

Lozano, et al., Spatial-temporal Causal Modeling for Climate Change Attribution, KDD 2009, Paris France, ACM 2009, 10 pages.

Nzouonta, et al, VANET Routing on City Roads using Real-Time Vehicular Traffic Information, IEEE Transactions on Vehicular Technology, vol. 58, No. 7, Sep. 2009, <<http://web.njit.edu/~gwang/publications/TVT09.pdf>>.

Office Action for U.S. Appl. No. 12/037,347, mailed on Aug. 17, 2011, Yu Zheng, "System for Logging Life Experiences Using Geographic Cues", 9 pgs.

Pelekis, et al., Unsupervised Trajectory Sampling, Proceedings of the European Conference on Machine Learning and Principles and Practice of Knowledge Discovery in Databases ECML PKDD 2010, pp. 17-33, 2010.

Ringberg, et al., Sensitivity of PCA for Traffic Anomaly Detection, SIGMETRICS 2007, pp. 109-120.

Rosenfeld, Connectivity in digital pictures. Journal of the ACM (JACM), 17(1):160, 1970.

Rosenfeld, Connectivity in digital pictures, Journal of the ACM 17 (1): pp. 146-160, 1970.

Shekhar, et al., Unified approach to detecting spatial outliers, University of Helsinki 2007, 27 pages, <<http://www.cs.helsinki.fi/u/leino/opetus/spatial-k07/maksimainen.pdf>>.

Shklovski, et al., Urban Computing-Navigating Space and Context. IEEE Computer Society. 39 ,9, pp. 36-37, 2006 <<http://www.itu.dk/people/irsh/pubs/UrbanComputingIntro.pdf>>.

Sun, et al., On Local Spatial Outliers, Technical Report No. 549, Jun. 2004, <<http://sydney.edu.au/engineering/it/research/tr/tr549.pdf>>, 9 pages.

Wu, et al., Spatio-Temporal Outlier Detection in Precipitation Data, Knowledge Discovery from Sensor Data, pp. 115-133, 2010, <<http://sydney.edu.au/engineering/it/~ewu1/publications/WuLiuChawlaSensorKDD2008.pdf>>.

Yan, et al., Discovery of frequent substructures, Wiley-Interscience, 2007, 99-113.

Yuxiang, et al., Detecting Spatio-temporal Outliers in Climate Dataset: A Method Study, IEEE 2005, pp. 760-763.

Zhang, et al., iBAT: Detecting Anomalous Taxi Trajectories from GPS Traces, Proceedings of UbiComp Sep. 2011, 10 pages.

Zhang, et al., Network Anomography, USENIX Association, Internet Measurement Conference 2005, pp. 317-330.

Zheng, et al., GeoLife: A Collaborative Social Networking Service among User, Location and Trajectory. IEEE Date Engineer Bulletin, 33(2). IEEE press 2010, 32-40, <<http://sites.computer.org/debull/A10june/geolife.pdf>>.

Zheng, et al., Recommending friends and locations based on individual location history. In ACM Transaction on the Web, 2011, 44 pages, <<http://research.microsoft.com/pubs/122435/RecomFriend-zheng-Published.pdf>>.

Zheng, et al., T-Drive: Driving Directions based on Taxi Trajectories, In Proc. ACM SIGSPATIAL GIS 2010. ACM Press, 2010, 10 pages, <<http://www.cse.unt.edu/~huangyan/6350/paperList/T-Drive.pdf>>.

Ziebart, et al., Navigate like a cabbie: Probabilistic reasoning from observed context-aware behavior. In Proc. Ubicomp 2008, pp. 322-331, <<http://citeseerx.ist.psu.edu/viewdoc/download?doi=10.1.1.141.7187&rep=rep1&type=pdf>>.

Min-qi et al., "An Algorithm for Spatial Outlier Detection Based on Delaunay Triangulation," In the Proceedings of the 2008 International Conference on Computational Intelligence and Security, 2008, pp. 102-107.

Office Action for U.S. Appl. No. 12/353,940, mailed on Mar. 23, 2012, Yu Zheng, "Detecting Spatial Outliers in a Location Entity Dataset," 6 pages.

Office Action for U.S. Appl. No. 12/773,771, mailed on Mar. 26, 2012, Yu Zheng, "Collaborative Location and Activity Recommendations," 9 pages.

Office Action for U.S. Appl. No. 12/711,130, mailed on Mar. 27, 2012, Yu Zheng, "Mining Correlation Between Locations Using Location History," 14 pages.

Shekhar et al., "Data Mining for Selective Visualization of Large Spatial Datasets," In the Proceedings of the 14th IEEE International Conference on Tools with Artificial Intelligence, 2002, pp. 41-48.

Ye et al., "Mining Individual Life Pattern Based on Location History," Tenth International Conference on Mobile Data Management: Systems, Services and Middleware, May 18-20, 2009, Taipei, 10 pages.

Zhang et al., "A Taxonomy Framework for Unsupervised Outlier Detection Techniques for Multi-Type Data Sets," Technical Report TR-CTIT-07-79, Centre for Telematics and Information Technology University of Twente, Enschede, 2007, 40 pages.

* cited by examiner

MINING LIFE PATTERN BASED ON LOCATION HISTORY

BACKGROUND

Data mining collects data and extracts patterns from the data. As data collecting continues to increase in volume, data mining is playing a larger role in transforming the vast amount of data into information that may be used in various applications. Data mining attempts to uncover patterns present in the data while removing missing data and observations with noise.

Problems with data mining have occurred with training sets. Initially, a training set of the data was created to train a data mining algorithm while a test set verifies the accuracy of patterns discovered. However, patterns identified in the training set were not necessarily found in the general data set. This meant evaluating the data by using a test set of data in which the algorithm was not trained on, to apply learnt patterns. Another option was to look for existing patterns in the data through association, rather than use a training set.

Data mining is now being attempted on spatial data, which is data or information that identifies the geographic location of features and boundaries on Earth. Spatial data is collected for geographical locations of people by a wide range of location-acquisition technologies. By logging or recording location histories of individuals, the spatial data may contain each log point as an absolute time spot. A problem that occurs with the conventional location-acquisition technologies is deciding whether to use this absolute time information or to calculate a time interval between two points as a time annotation.

Other challenges include identifying patterns of the spatial data, data interoperability of the spatial data with temporal data (i.e., data with a time period attached), no semantic meaning associated with the spatial data, and accounting for time periods into geographic representations and relationships. The challenges of data mining and the increasing availability of location histories of individuals provide opportunities to discover knowledge from this data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes mining a life pattern of an individual, for example, by identifying places visited during the individual's daily activities. Mining the individual life pattern includes collecting location data for the individual and predicting behaviors and preferences of the individual based at least in part on a location history. The location history of the individual is represented with a sequence of geographical regions that have been visited by the individual with corresponding arrival and departure times for each region. Once the life pattern is predicted from the location history, information is recommended to the individual based at least in part on the life pattern.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As discussed above, spatial data mining may not always provide an effective way of calculating a time interval between two points as a time annotation. For example, in some instances it may be difficult to determine which time periods or time intervals are associated with geographic representations and relationships. Moreover, spatial data mining may not be able to identify a semantic meaning of the data information. This disclosure describes various exemplary ways of mining a life pattern, for example, by collecting location data, extracting a place visited from the location data, and predicting a life pattern of the individual to provide information useful and beneficial to the individual.

In an implementation, mining a life pattern collects the location information of an individual and extracts a place that the individual has stayed or visited over a time period and the place is within a distance amount away from another place. The process builds a location history tree by using a hierarchical clustering algorithm to cluster places visited that are of a similar type. Mining the life pattern applies techniques that have been identified to identify different types of life patterns. Information is recommended to the individual based at least in part on life patterns. By way of example and not limitation, the information provided to the individual may include advertisements, sales promotions, schedule times for public transportation, a route for travel, movie or book promotions, and the like.

While aspects of described techniques can be implemented in any number of different computing systems, environments, and/or configurations, implementations are described in the context of the following exemplary computing environment.

Illustrative Environment

Figure 1:
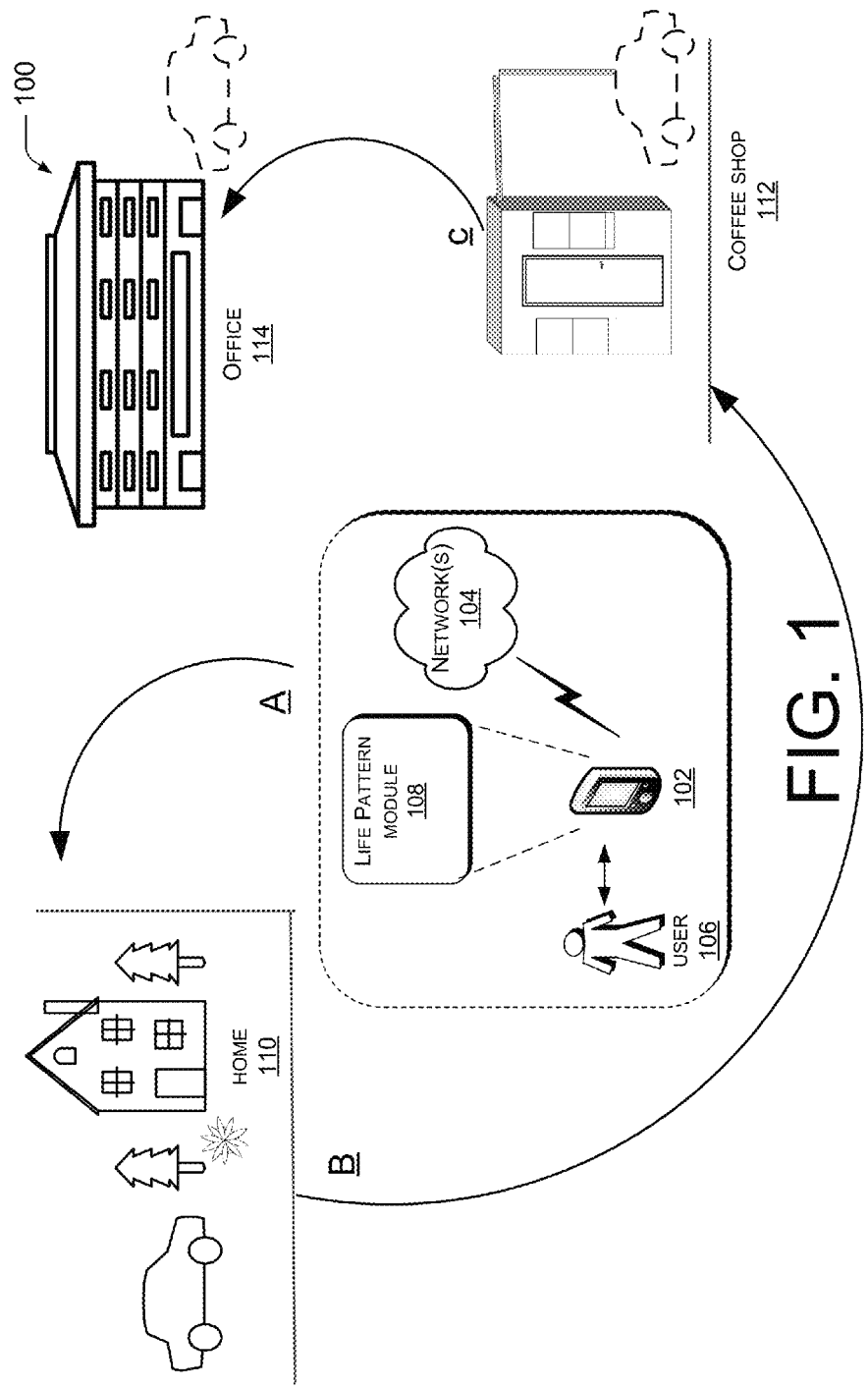
FIG. 1 is a schematic showing an exemplary environment for collecting location data on a computing device used for mining a life pattern.

FIG. 1 is a block diagram of an exemplary environment 100, in which mining a life pattern may occur by collecting location data on a computing device. The environment 100 includes an exemplary computing device 102, which may take a variety of forms, including, but not limited to, a portable handheld computing device (e.g., a personal digital assistant, a smart phone, a cellular phone), a laptop computer, a desktop computer, a media player, a digital camcorder, an audio recorder, a camera, or any other device capable of connecting to one or more network(s) 104 to log or to record daily activities for a user 106 (i.e., creating a location history). The computing device 102, which connects to one or more network(s) 104, is often associated with the user 106. For example, the user 106 often carries their computing device 102 when travelling outside the home. The term user 106 is used interchangeably with the term individual.

The network(s) 104 represents any type of communications network(s), including wire-based networks (e.g., cable), wireless networks (e.g., cellular, satellite), cellular telecommunications network(s), and IP-based telecommunications network(s) (e.g., Voice over Internet Protocol networks). The network(s) 104 may also include traditional landline or PSTN network(s), or combinations of the foregoing (e.g., Unlicensed Mobile Access or UMA networks, the circuit-switched telephone networks or IP-based packet-switch networks).

In the illustrated example, the computing device 102 may include a life pattern module 108 to implement mining an individual life pattern based on their location history. The life pattern module 108 interacts with an array of location-acquisition technologies available via the network(s) 104. The access location-acquisition technologies and network(s) 104 may include a plurality of network service providers, applications, a receiver in computing device, a locator in computing device, and the like with a Global Positioning System (GPS) network, a Global System for Mobile communications (GSM) network, Wi-Fi and the like. In this example, the computing device 102 accesses a global positioning system (GPS) network that conveniently logs navigation and positioning information of the user 106.

In FIG. 1, the arrows illustrate an example of daily weekday activities in a life of the user 106. Starting with the arrow identified as A, the user 106 typically has their computing device 102 within access, the computing device 102 is connected to the network 104. Initially, the user 106 is at home in the morning and leaves their home 110 about 8:30 am in the morning. The user 106 may be driving a vehicle shown on the left side of the home 110. A GPS receiver in the computing device 102 may start collecting location data of the user 106 upon detecting a satellite signal. The GPS receiver may collect the location data based on pre-determined time period conditions, such as every ten seconds, every 30 seconds, and the like. In another implementation, the life pattern module 108 logs GPS data of the user 106. This location data is transformed into spatial-temporal data.

Leaving home 110, the arrow B illustrates the user 106 travels along arrow B to the south, as shown as the lower half of the figure. The user 106 arrives at a coffee shop 112 to purchase a cup of coffee and stays there for approximately ten minutes. Then the user 106 leaves the coffee shop 112, shown as arrow C to drive to the office 114. The GPS receiver continues to collect the location data as long as there is a satellite signal detected on the GPS network 104.

The data collected by the GPS receiver goes through a process by the life pattern module 108 to mine the individual life pattern. The individual life pattern is analyzed from the individual location history. The life pattern module 108 provides information through a network service provider, a context-aware computing service, via emails, via text messages, pop ups, and the like. A detailed discussion of the process follows.

Exemplary Computing Device

Figure 2:
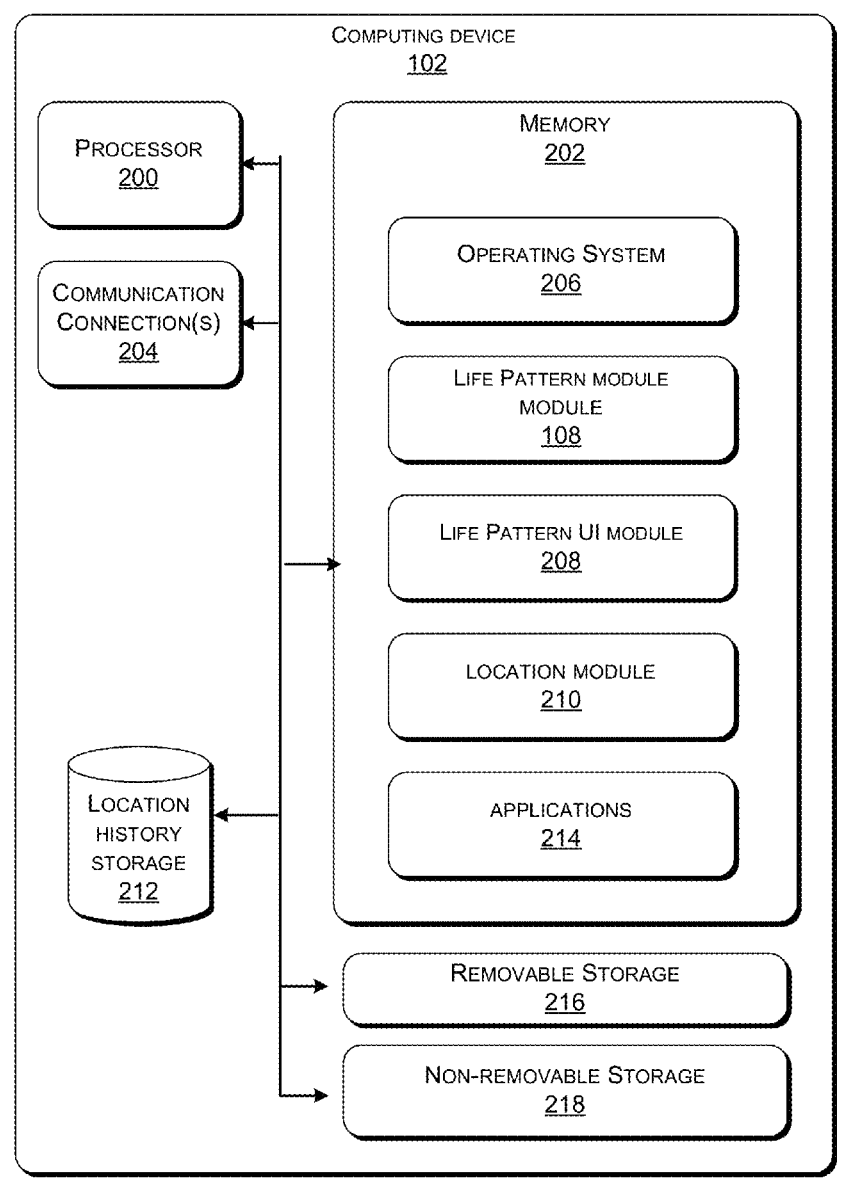
FIG. 2 is a block diagram showing an exemplary computing device usable for collecting location data and usable for mining the life pattern, in the environment of FIG. 1.

FIG. 2 is a block diagram showing an exemplary communication device. The computing device 102 may be configured as any suitable system capable of mining the life pattern, which includes, but is not limited to, receiving or collecting location data, extracting a place visited, transforming the location data, storing the location data, analyzing the location data, and presenting information based on the life pattern.

In one exemplary configuration, the computing device 102 includes a processor 200, a memory 202, and one or more communication connections 204. The communication connection(s) 204 may include a wide area network (WAN) module, a local area network module (e.g., Wi-Fi), a personal area network module (e.g., Bluetooth), and/or any other suitable communication modules to allow the computing device 102 to communicate over the network(s) 104.

Turning to the contents of the memory 202 in more detail, the memory 202 may include an operating system 206, the life pattern module 108, and a life pattern user interface (UI) module 208.

The life pattern module 108 when executed on the processor 200, may collect location data, build a life history tree, mine atomic life patterns, mine conditional life or non-conditional life patterns, and provide information to the user 106 based on the life pattern. In another implementation, the life pattern module 108 may work in conjunction with the GPS receiver to collect location data.

The life pattern UI module 208, when executed on the processor 200, collectively facilitate presentation of a user interface on a display of the computing device 102. The life pattern UI module 208 may, in some implementations, visually present information to the user 106 on the computing device 102, based at least in part on the life pattern. This information recommended to the user 106 is based on behaviors and preferences of the user 106, as identified by the life pattern module 108. This information recommended may include but is not limited to: advertisements or sale promotions; schedule times for public transportation; route arrangements for travel by public transportation or by vehicle; alternative routes to avoid traffic, accidents, or hazardous road conditions; a suggested time to travel to places that one has previously visited to avoid crowds or traffic; movie or book promotions; and the like. The information may be provided by a network service provider, a context-aware computing service, a web application, a web application based on a live search map, a personal schedule system, a computer-aid blogging system, a route recommending system, a weather service, emails or text messages, and the like.

This visual representation of the information allows the user 106 to visually select an item that may be more relevant or applicable at the time. Furthermore, in some implementations, the life pattern UI 208 may visually present a representation of advertisements, such as discounts or coupons for products, stores, or restaurants. The visual representation allows the user 106 to visually view the information and the actions that may need to be performed for the information. For example, by providing the visual representation of a schedule time for public transportation, the user 106 may be prompted to purchase a ticket or to make arrangements to ensure catching the last bus or the last subway. This provides assurance to the user 106 of actions that may need to be performed based on the information.

In another implementation, the life pattern module 108 may provide information to the user 106, such as a movie promotion, based on identifying the life pattern that the user 106 goes to a movie theatre every weekend. In another implementation, the life pattern module 108 may provide information to the user 106, such as restaurant suggestions, based on identifying the life pattern that the user 106 goes out to dinner at a restaurant every Saturday.

The memory 202 includes a location module 210 and a location history storage 212. The location module 210 may collect and receive positioning and navigation information of the user 106. For example, the navigation module 210 may collect and receive GPS data tracking the daily activities of the user 106. As mentioned earlier, the GPS receiver is an example of a location module 210. The location history storage 212 may locally store several items of the daily, weekly, or monthly activities of the user 106, such as the positioning and the navigation information. Storing this information, (i.e., the location history) on the location history storage 212 offers the life pattern module 108 accessibility to the location history, if there is no network service available.

The memory 202 may also include one or more other applications 214 for implementing a part of the mining life pattern services and various other functionality, such as receiving an advertisement, displaying an event on a calendar application, receiving an email or a text message, a media player application, and the like.

The computing device 102 may also include additional removable storage 216 and/or non-removable storage 218.

Any memory described herein may include volatile memory (such as RAM), nonvolatile memory, removable memory, and/or non-removable memory, implemented in any method or technology for storage of information, such as computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

While the computing device 102 shown is an implementation, the environment 100 may also include one or more life pattern servers. The life pattern servers may be a representative set of servers that is accessible via the network(s) 104. The life pattern servers may be independent servers, or a collection of servers that are configured to perform larger scale functions (e.g., a server farm or datacenter) accessible by the network(s) 104. The servers may represent private multiple content servers to implement functionalities, such as collecting positioning and navigation data, mining individual life pattern based on location history, and providing information to the user 106 via the computing device 102. Thus, the life pattern server may be administered or hosted by a network service provider that provides mining life pattern services to and from the computing device 102.

The life pattern server as described above may be implemented in various types of systems or networks. For example, the mining life pattern server may be a part of, including but is not limited to, a client-server system, a peer-to-peer computer network, a distributed network, an enterprise architecture, a local area network, a wide area network, a virtual private network, a storage area network, and the like.

Exemplary Processes

FIGS. 3, 6, 7, and 8 are flowcharts showing exemplary processes for collecting the location data to build a location history tree, identifying life patterns based on location history, mining atomic life patterns, and mining non-conditional life patterns to provide information based on at least in part on the life pattern, respectively. The processes are illustrated as a collection of blocks in logical flowcharts, which represent a sequence of operations that can be implemented in hardware, software, or a combination. For discussion purposes, the processes are described with reference to the computing environment 100 shown in FIG. 1 and the computing device 102 shown in FIG. 2. However, the processes may be performed using different environments and devices. Moreover, the environments and devices described herein may be used to perform different processes.

For ease of understanding, the methods 300, 600, 700, and 800 are delineated as separate steps represented as independent blocks in FIGS. 3, 6, 7, and 8. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps will be omitted.

Figure 3:
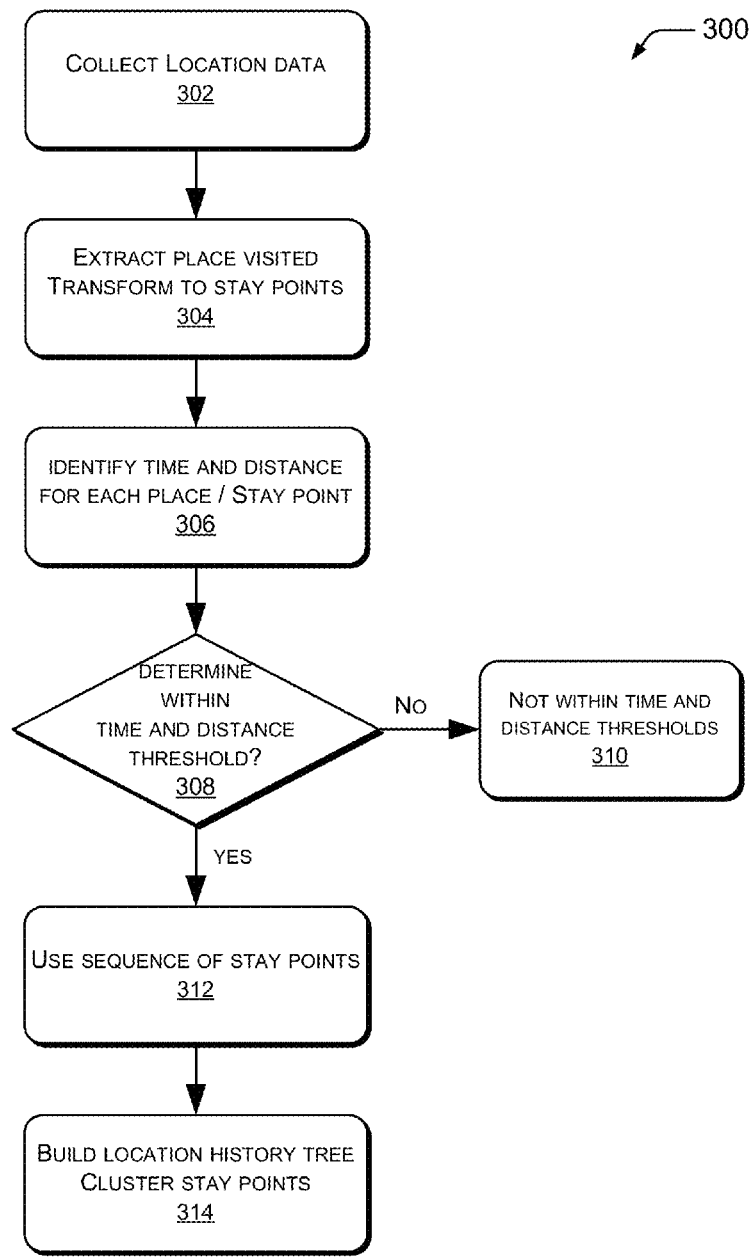
FIG. 3 is a flowchart showing an exemplary process for building a location history tree.

FIG. 3 is a flowchart illustrating an exemplary process 300 of building a location history tree usable for mining the life pattern. In an implementation, a model may be created to represent an individual's location history. The model may be created using the techniques as discussed in this flowchart.

The process may collect or receive location data 302 for the individual on the computing device 102. The location data may include latitude, longitude, and time data from the GPS network. The life mining pattern module 108 uses the location data to build the location history tree or to create the model representing the individual's location history.

In block 304, the process may extract a place visited or stayed by the user 106 from the location data. The place visited or stayed that is extracted may be considered "significant" as a place the individual visits or stays for a significant period of time or having a significant value in the individual's daily activities. The place extracted is based on spatial and temporal values of GPS points. Furthermore, the process may transform the place visited in the location data to a stay point. Thus, the stay point represents a geographical region in which the individual visits or stays for a while. Therefore, each stay point has a semantic meaning. For example, the living and working places the individual stays at, the restaurant and shopping mall the individual visits, the vacation spot that the individual travels to, and the like.

In block 306, the process may identify a time period and a distance amount for each place apart from another place. The time and distance is associated with a stay point, which represents a significant place.

In block 308, the process may determine whether the place visited is fulfills a time threshold and a distance threshold. The place visited is identified as a stay point if the user stays or visits the place longer than the time threshold and within the distance threshold.

If the place visited does not fulfill the time threshold and the distance threshold, the process moves to the right to block 310. Here, the place visited is not considered to be a stay point or a significant place, and is not used as data for mining the individual life pattern. In an implementation, the stay point detection may have a time threshold of 20 minutes and a distance threshold of 200 meters. For example, the user may stay or visit the place for less than 15 minutes within a distance of 120 meters. Thus, this place does not fulfill the time threshold, though fulfilling the distance threshold, so the place is not used or considered a significant place.

Returning to block 308, if the place visited is over the time threshold and within the distance threshold, the place visited is considered a stay point or a significant place. In an implementation, the stay point detection may have a time threshold of 20 minutes and a distance threshold of 200 meters. If the individual stays over 20 minutes within a distance of 200 meters, the stay point is detected. From here, the process proceeds to block 312.

At block 312, the process uses a sequence of stay points with transition intervals to represent the individual's location history. This location history may be used for the location history tree or as part of the model.

At block 314, the process builds a location history tree (or creates a model) using a hierarchical clustering algorithm. All of the stay points associated with the individual are put into a dataset and clustered into several geographical regions. The hierarchical clustering algorithm clusters the geographical region by grouping and identifying similar places visited by the individual. The process may also detect clusters with irregular structure. For example, stay points of the same place are directly clustered into a density-based closure while clusters with valuable semantics may be detected, such as a set of restaurants or travelling areas near a lake.

The process may cluster geographical regions by using parameters. The stay point cluster may be grouped based on identifying a number of stay points threshold and a distance threshold. For example, the number of stay points threshold may be four and the distance threshold may be 0.15 km. If there are at least four stay points within 0.15 km of an already clustered stay point, the stay points may be added to the cluster.

Figure 4A:
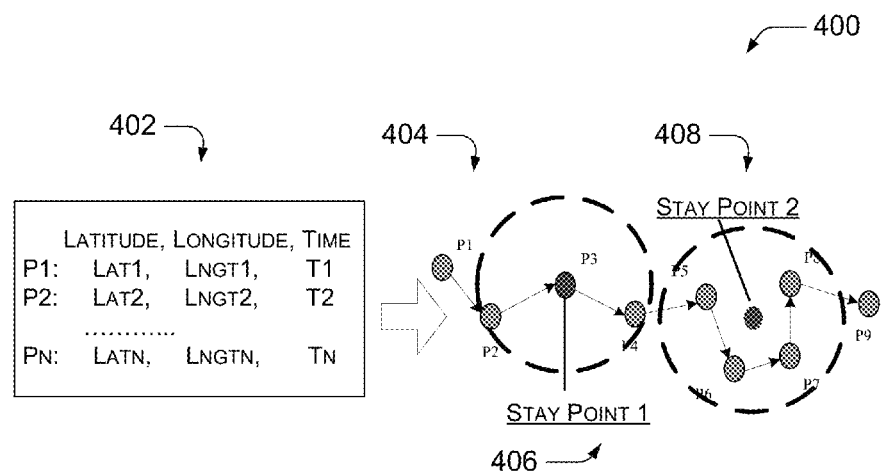
FIG. 4a is a schematic showing an exemplary process of collecting location data and transforming to stay points.

FIG. 4a represents a schematic diagram 400 of location data collected and stay points usable for mining the life pattern. Shown at 402 are GPS logs. The data collected is a sequence of time-stamped points, shown as P={p1, p2, . . . pn}. Each point $p_i \in P$ contains the latitude ($p_i$.Lat), the longitude ($p_i$.Lngt), and the timestamp ($p_i$.T). At 404, the process connects the GPS points according to their time series into a GPS trajectory. As mentioned previously, the process extracts significant places based on the spatial and temporal values of the GPS points.

At 406, the stay point S1 is the geographical region where the individual has remained stationary indoors at P3 for over a time period. This type of stay points occurs when the individual enters a building, causing the satellite signal to be lost. Once the individual returns outdoors, the satellite signal is detected again.

At 408, the stay point S2 is the geographical region where the individual wanders around within a spatial region for over a time period. The process constructs a stay point using the mean longitude and latitude of the GPS points within the region. Typical, stay points of this type occur when the individual wanders around outdoor places that detect the satellite signal, like a park, a campus, and the like.

Figure 4B:
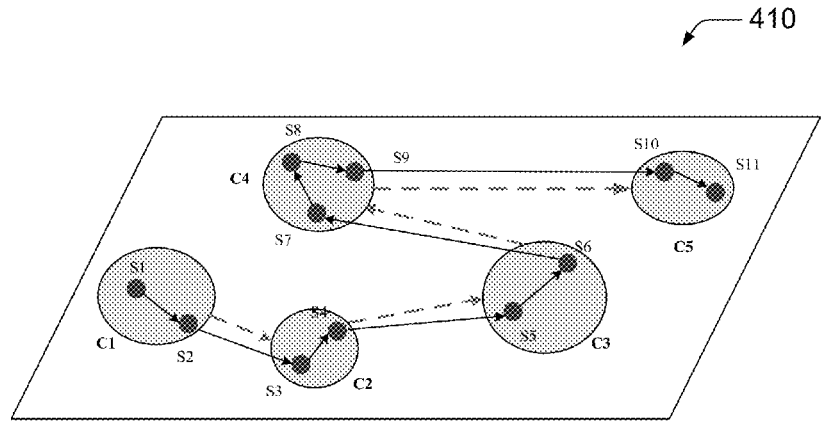
FIG. 4b is a schematic showing an exemplary process of clustering a sequence of stay points.

FIG. 4b represents a schematic diagram of a sequence of stay points and clustering 410 usable for mining the life pattern. The stay point sequence S={$s_1$, $s_2$, $s_3$, . . . , $s_n$} represents the location history of the individual. Each stay point $s_i$ corresponds to some significant place while $s_i$.arvT and $s_i$.levT correspond to the time of arriving and leaving this place. The process applies density-based clustering by clustering the stay points into several geographical regions. In an implementation, the process applies OPTICS clustering with two parameters, number of points (NoP) and distance threshold (disThre), when there are at least NoP points within DisThre of a clustered point. Thus, the new points are added to this cluster; formed as a closure of points.

After the clustering of the stay points, the process transforms the individual stay point sequence into a location history sequence C={$c_1$, $c_2$, . . . , $c_n$}. Each stay point is substituted by the cluster it pertains to, with arrival and departure times of the stay point retained and associated with the cluster. The process has location history records for different days, such as visiting the same place like the office or a restaurant. The process uses the temporal value in mining timespan-annotated and timestamp-annotated life patterns.

Figure 5A:
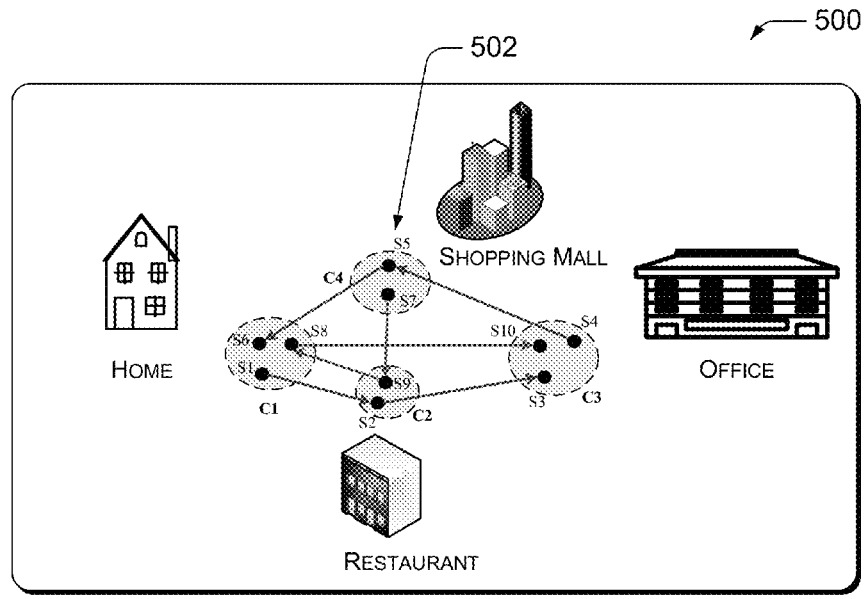
FIG. 5a is a schematic showing an exemplary process of clustering stay points relative to locations.

FIG. 5a represents a schematic diagram 500 of the location history of the individual usable with the mining life pattern. The location history is represented by the sequence of stay points with transition intervals. Shown at 502 is location history sequence c4 at the shopping mall with stay points S5 and S7. Two stay points may not have the same spatial coordinates due to the locations. For example, stay points for the place "office" on different days are not identical, although they are very close to each other.

Figure 5B:
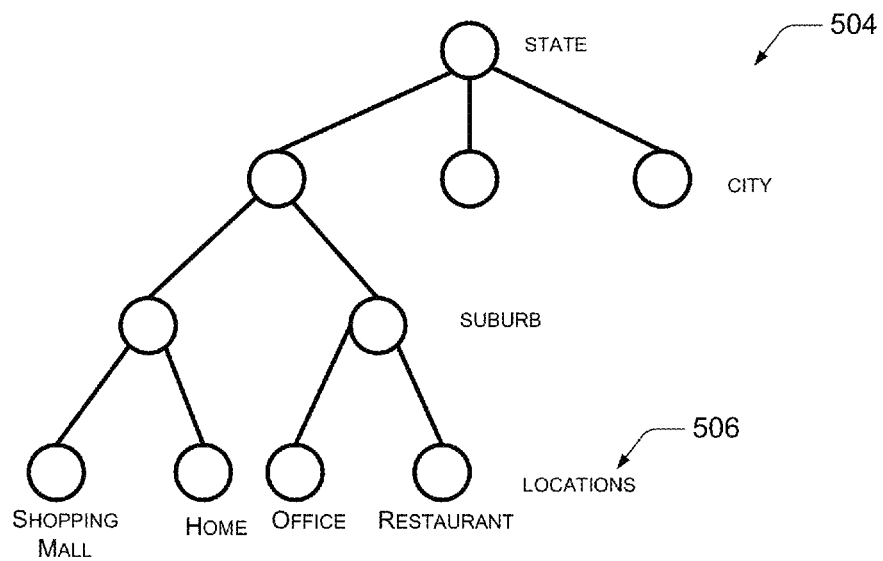
FIG. 5b is a schematic showing an exemplary location history tree.

FIG. 5b represents a schematic diagram of an illustrative location history tree 504 usable for mining the life pattern. As mentioned, the process uses a hierarchical clustering algorithm to create the tree. Shown at a root node is a state, which is the highest level. Shown below the root node is a city level, which is the second highest level to identify the cities; a suburb level, which is the third level to identify the suburbs within a city; and location level, which is the fourth level to identify the places within the suburb, the city, and the state. For example, the state may be WA, the city may be Seattle, the suburb may be Bellevue, and the locations 506 are shopping mall, home, office, and restaurant. The location level 506 corresponds to the locations shown in FIG. 5a.

Figure 6:
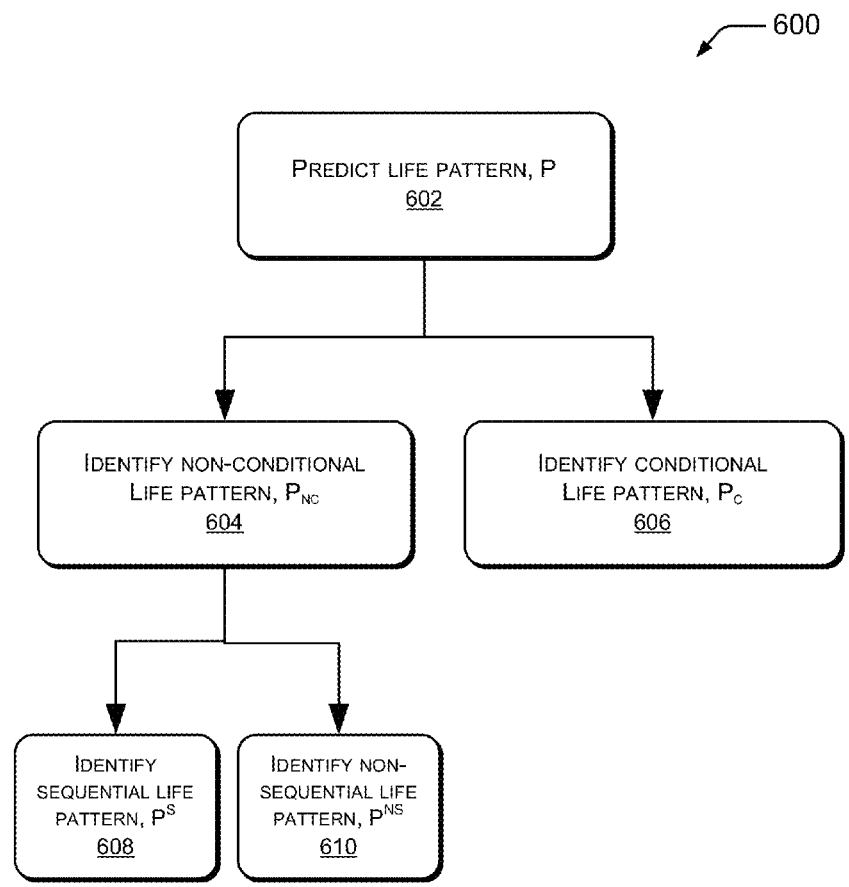
FIG. 6 is a flowchart showing an exemplary process of mining life patterns.

FIG. 6 is a flowchart of an illustrative process 600 for an overview of predicting life patterns of the individual by the life pattern module 108. In block 602, the process 600 receives the location history and uses the location data to predict the life pattern, P. The life pattern P emphasizes the significant places in the individual's GPS record while ignoring the transition between these places. The significant places such as schools, offices, hospitals, grocery stores, and the like represent the individual's typical activities. For example, a simple life pattern P may be: "In 70% of the days, Tony visits the Paulsen Building in Spokane, Wash.".

The life pattern P 602 may be further identified as a non-conditional life pattern Pnc or a conditional life pattern Pc. Proceeding to the left is to identify the life pattern as the non-conditional life pattern Pnc 604 and to the right to identify the life pattern as the conditional life pattern Pc 606. Thus, the life pattern P may be represented as: $P:=P_c|P_{nc}$.

The non-conditional life pattern Pnc 604 may be further mined by closet+ and CloSpan techniques. The non-conditional life pattern Pnc 604 may be further identified as a sequential life pattern $P^s$ 608 or a non-sequential life pattern $P^{ns}$ 610. Thus, the non-conditional life pattern Pnc 604 may be represented by this form:

$$P_{nc}:=P^s|P^{ns}.$$

The sequential life pattern $P^s$ 608 takes into account isolated significant places visited and an order in which the individual visits them. For example, the sequential life pattern may be: "In 50% of the days, Tom takes this route: Tsinghua University→Sigma Building→Grocery Store on 11 Seventh Street. The non-sequential life pattern $P^{ns}$ 610 takes into account the isolated significant places visited, but without an order in which the individual visits them. For example, the non-sequential life pattern may include: "In 30% of the days, Bailey travels in a route to visit (no particular order): Grocery Store, Dry Cleaners, Home; while 31% of the days, Bailey travels in a route to visit: Day Care, Home, Grocery Store; while 39% of the days, Bailey travels in a route to visit: Home, Dry Cleaners, Day Care.

Returning back to the conditional life pattern Pc 606, which may be interpreted as one non-conditional pattern given another non-conditional pattern and carries the meaning that one type of life regularity happens on condition of another. The conditional life pattern 606 may be represented as:

$$P_c := P^1{}_{nc} | P^2{}_{nc}.$$

Thus, the conditional life pattern 606 uses another life pattern to constrain the observation unites, like:

"Among the days on which Toby visits the Empire State Building, in 90% of the time, he arrives between 8:50 a.m. to 9:10 a.m. and stays for more than three hours but less than five hours".

Figure 7:
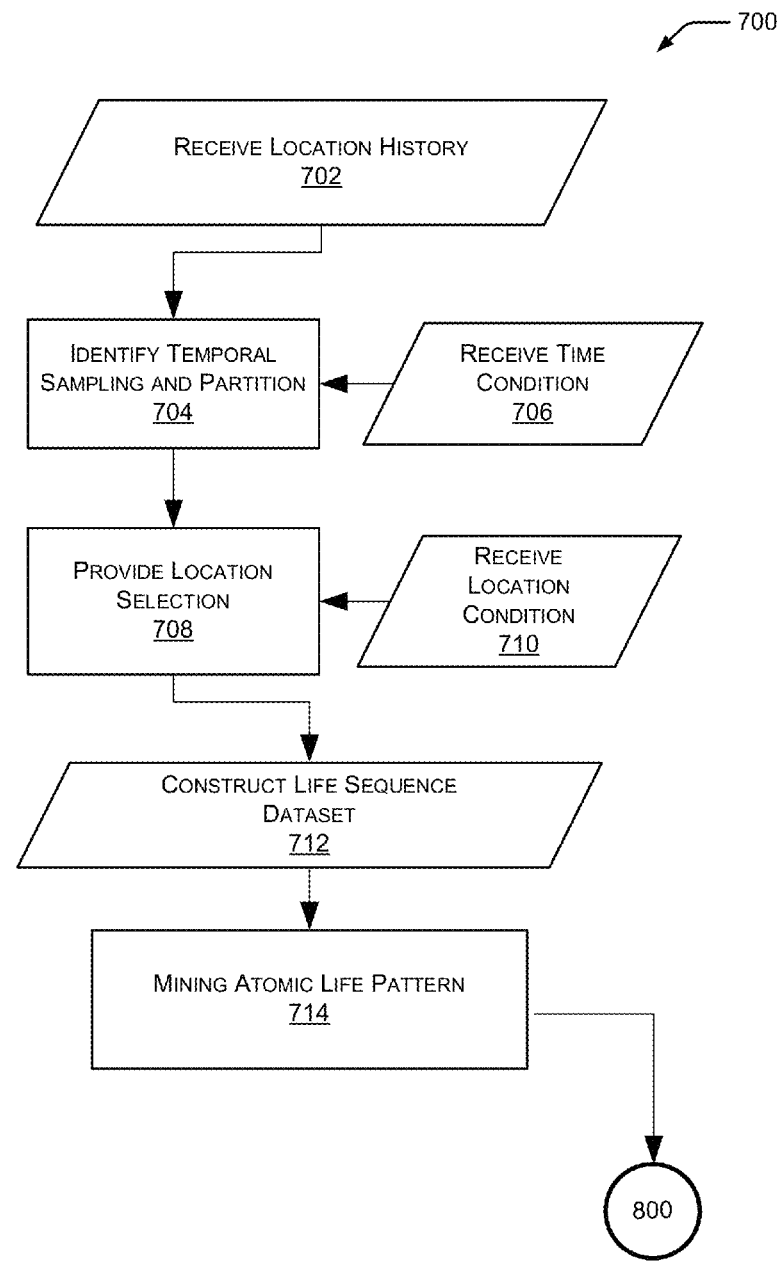
FIG. 7 is a flowchart showing an exemplary process of mining atomic life pattern.

FIG. 7 is a flowchart showing an illustrative process of mining atomic life pattern 700 by the life pattern module 108. An atomic life pattern refers to visiting a single significant place, with or without timestamp or timespan annotations. The process 700 receives the location history 702 which includes the significant place, the individual's arrival time, the departure time (timestamp), and the duration time (timespan) of each significant place. The timestamp and timespan give valuable description about the individual's life style.

For example, the timestamp annotation and timespan annotation may be: "In 65% of the days, Barry arrives at the Paulsen Building between 9 a.m. to 9:30 a.m. and stays for more than three hours and less than five hours". Other examples include: "Mary typically arrives at a coffee shop located on the corner of Fifth and Main Streets between 2 and 3 pm", "Mary typically stays in the coffee shop located on the corner of Fifth and Main Streets for 1 to 1.5 hours", and "Mary typically arrives at the coffee shop located on the corner of Fifth and Main Streets between 2 and 3 pm and stays there for 1 to 1.5 hours".

Shown at 704 is to identify temporal sampling and partition while receiving a time condition 706 specified by the individual. Temporal sampling 704 deals with temporal condition 706 (data with a time period attached). The temporal condition 706 specified by the individual may include a time span and/or temporal type.

As mentioned above, the atomic temporal observation unit of life is "day", which is attributed to the daily-repetitious nature of human activity. A different scale of temporal unit (temporal granularity) corresponds to patterns of different semantics. For example, using "day" as the unit, a life pattern like "Tom visits the cinema once a week" may not be discovered. However, there are also life patterns associated with specific temporal conditions, such as "on Mondays", "on work days", and "on weekends". These conditions may be intuitive because the individual may have a different life style on different type of days, such as weekends, weekdays, or holidays.

The temporal partition 704 corresponds to the temporal granularity. The original location history sequence that is received 702 is partitioned into subsequences according to the specific granularity like the time condition 706, of "day", "week", and the like. From here, the process 700 may proceed to provide location selection 708. In another implementation, the process 700 may go directly to constructing an individual life sequence dataset 712.

Providing location selection 708, the process recognizes the location or a significant place while receiving a location condition 710 from the individual. The location condition is the geographical region that is of interest to the individual, which is specified by him or her. The life pattern tends to emphasize the significant places in the individual's GPS record while ignoring the transition between these places. The significant places, such as home, schools, offices, hospitals may represent the individual's typical activity. For example, a simple life pattern may be: "In 70% of the days, Tom visits the Sigma Building".

The process 700 proceeds from identifying temporal sampling 704 and providing a location selection 708 to constructing a life sequence dataset 712. The life sequence dataset 712 may be represented as $D^s = \{d1, d2, d3, \ldots dn\}$. Each di in $D^s$ corresponds to the life sequence of one day, or one week, or the like, according to the granularity. This life sequence dataset 712 may be used for mining sequential life patterns 608 and non-sequential life patterns 610.

The process 700 performs mining atomic life pattern 714 on this dataset $D^s$. The atomic temporal observation unit of life is a "day". This may be attributed to the daily-repetitious natural behavior of human activity. The atomic life pattern A is of the form:

$$A := \text{visit}(X)(?\text{arv}([t1, t2]))(?\text{stay}([T1, T2]))$$

where the symbol ? mean A can either be timestamp/timespan annotated or not; t1, t2 are two timestamps; and T1, T2 are lengths of two timespans. The departure time annotation may be derived from the arrival timestamp and stay timespan. Once the mining atomic life pattern 714 occurs by using algorithms, such as FP-growth, MAFIA, CHARM, or Closet+. Examples of possible results include: "In the last year, the individual went to Chicago once a month, the individual visited there on the weekend, the individual spent 3 hours at a theatre, and went to dinner at a restaurant every Saturday." This atomic life pattern is used in FIG. 8 for additional mining life patterns.

Figure 8:
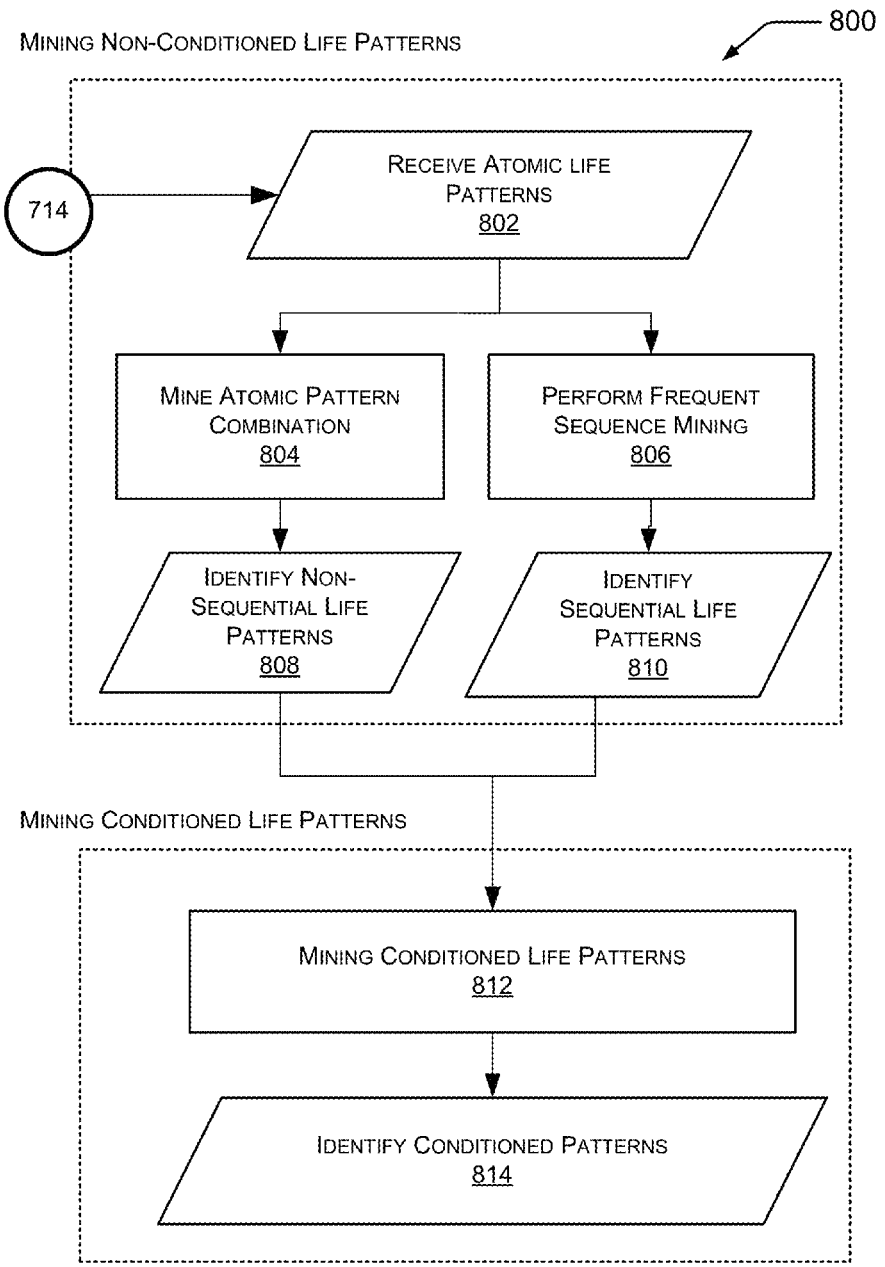
FIG. 8 is a flowchart showing an exemplary process of mining non-conditional and conditional life patterns.

FIG. 8 illustrates a flowchart for exemplary mining non-conditional life patterns and mining conditional life patterns 800. Block 802 shows the process receives the atomic life patterns from 714. The process then proceeds to the left to mine atomic pattern combination 804 and to the right to perform frequent sequence mining 806.

Mining atomic pattern combination 804 identifies two or more atomic life patterns to combine them. The process may use two operators which combine atomic life patterns into a more complex one: the "and" operator "∧ "and the "sequence" operator "− ".Examples of combining atomic patterns include "In the last year, the individual went to a playhouse located on 11 Main Street once a month, in most cases, the individual visited in a weekend evening and spent two-three hours there."

From mine atomic pattern combination 804, the process moves to identify non-sequential life patterns $P^{ns}$ 808. The identifying non-sequential life patterns $P^{ns}$ 808 may be represented by:

$$P^{ns} := A | P^{ns} \wedge A.$$

Returning to perform frequent sequence mining 806, the process applies a frequent pattern mining algorithm. For each di in $D^s$, the sequential property may be ignored and each di is treated as a set of significant places. The frequent pattern mining algorithm applies several strategies such as a hybrid tree projection method or the item skipping technique to effectively retrieve frequently closed item set.

The process proceeds to identify sequential life patterns $P^s$ 810. This may be represented and generated by:

$$P^s := A \| P^s \to A.$$

Mining sequential life patterns $P^s$ uses algorithms like CloSpan.

Using the information from non-sequential life patterns 808 and sequential life patterns 810, the process proceeds to mining conditional life patterns 812. Here, the conditional life pattern is represented by the form; $P_c = P^1_{nc} | P^2_{nc}$. This carries semantic meaning that a sequence contains $P^1_{nc}$ given that it contains $P^2_{nc}$. For mining conditional life patterns 812, the process applies a project-and-mining procedure. Given a mined non-conditional pattern $P^2_{nc}$, and the set of sequences containing $P^2_{nc}$, denoted U. The process constructs projected sequences set of U on $P^2_{nc}$, denoted U'. For each sequence in U, delete the elements corresponding to $P^2_{nc}$. Then another step of mining procedure is performed on U'. In some instances, a life associate rule may be generated from given underlying conditional life pattern.

In an implementation, the life pattern P may be associated with a support value s, which gives a percentage of temporal observation units when P is satisfied. Thus, the life pattern may be represented as (P, s). The conditional life pattern represented as $P_c := P^1_{nc} | P^2_{nc}$ may gives rise to a life associate rule $R: P^2_{nc}{}^2 \Rightarrow P_{nc}{}^1$. Life associate rule verifies from traditional associate rules. The traditional associate rule is defined in a context of basket analysis in transaction dataset. An associate rule a⇒b carries meaning that the consumer tends to buy product b on condition that he buys product a. There are two parameters: support (s) and confidence (c). s=Pr[a∧b] denotes how much the rule is supported by all transaction records:

$$c = Pr[b | a] = \frac{Pr[a \wedge b]}{Pr[a]}$$

denotes how much the rule may be confided. The associate rule is discovered if its support and confidence value both exceed separate thresholds.

The definition of life associate adopts only one support parameter, which equals to the support of underlying conditional life pattern and is the counterpart of confidence in traditional associate rule:

$$s(R) = Pr[P_1 nc^1 1 | P_1 nc^1 2] = Pr[P_{75} nc^1 1 \wedge P_1 nc^1 2] / Pr[P_1 nc^1 2] = (s(R))/(s(P_1 nc^1 2)).$$

As discussed above, certain acts in processes 300, 600, 700, and 800 need not be performed in the order described, may be modified and/or may be omitted entirely, depending on the circumstances.

Various instructions, methods, techniques, applications, and modules described herein may be implemented as computer-executable instructions that are executable by one or more computers, servers, or telecommunication devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

under control of one or more processors configured with executable instructions:

collecting location data associated with an individual;

extracting a plurality of locations from the location data and transforming the plurality of locations in the location data to a plurality of stay points, each stay point comprising one or more locations of the plurality of locations that define a geographical region in which the individual has stayed within a predetermined distance over a predetermined time period;

clustering the plurality of stay points into a sequence of stay point clusters, each stay point cluster comprising stay points corresponding to a same place or sharing a same semantic meaning within a specific distance threshold;

creating a location history of the individual with the sequence of stay point clusters;

predicting a life pattern of the individual based at least in part on the location history, the life pattern emphasizing places significant to the individual and ignoring transitions between the significant places;

generating a life associate rule based on the life pattern, the life associate rule comprising a rule describing a relationship between two non-conditional life patterns and a support value representing a probability of co-occurrence of the two non-conditional life patterns; and providing information to the individual based at least in part on the life pattern or the life associate rule.

2. The method of claim 1, wherein collecting the location data comprises collecting global positioning system (GPS) logs and converting the GPS logs according to a time series into a GPS trajectory for the individual.

3. The method of claim 1, wherein collecting the location data comprise collecting global position system (GPS) logs of a sequence of GPS points, each GPS point contains a longitude, a latitude, and a timestamp.

4. The method of claim 1, wherein the clustering further comprises building a location history tree, the location history tree comprising a plurality of nodes in a plurality of levels, each node representing a cluster of a subset of the plurality of stay points and each level in the tree representing a geospatial granularity which is different from the rest of the plurality of levels.

5. The method of claim 1, wherein the location history comprises a place visited or stayed for a period of time, a timestamp for arrival at the place visited, and a timestamp for departure from the place visited.

6. The method of claim 1, wherein the providing the information comprises recommending at least one of advertisements, sales promotions, schedule times for public transportation, a route arrangement for travel, an alternative route to avoid traffic, accidents, or hazardous road conditions, movie trailer, or a book promotion.

7. A storage device encoded with instructions that, when executed by one or more processors, configure the one or more processors to perform acts comprising:
- collecting location data associated with an individual;
- extracting a plurality of locations from the location data and transforming the plurality of locations in the location data to a plurality of stay points, each stay point comprising one or more locations of the plurality of locations that define a geographical region in which the individual has stayed within a predetermined distance over a predetermined time period;
- clustering the plurality of stay points into a sequence of stay point clusters, each stay point cluster comprising stay points corresponding to a same place or sharing a same semantic meaning within a specific distance threshold;
- creating a location history of the individual with the sequence of stay point clusters;
- predicting a life pattern of the individual based at least in part on the location history, the life pattern emphasizing places significant to the individual and ignoring transitions between the significant places;
- generating a life associate rule based on the life pattern, the life associate rule comprising a rule describing a relationship between two non-conditional life patterns and a support value representing a probability of co-occurrence of the two non-conditional life patterns; and
- providing information to the individual based at least in part on the life pattern or the life associate rule.

8. The storage device of claim 7, wherein collecting the location data comprises collecting global positioning system (GPS) logs and converting the GPS logs according to a time series into a GPS trajectory for the individual.

9. The storage device of claim 7, wherein collecting the location data comprise collecting global position system (GPS) logs of a sequence of GPS points, each GPS point contains a longitude, a latitude, and a timestamp.

10. The storage device of claim 7, wherein the clustering further comprises building a location history tree, the location history tree comprising a plurality of nodes in a plurality of levels, each node representing a cluster of a subset of the plurality of stay points and each level in the tree representing a geospatial granularity which is different from the rest of the plurality of levels.

11. The storage device of claim 7, wherein the location history comprises a place visited or stayed for a period of time, a timestamp for arrival at the place visited, and a timestamp for departure from the place visited.

12. The storage device of claim 7, wherein the providing the information comprises recommending at least one of advertisements, sales promotions, schedule times for public transportation, a route arrangement for travel, an alternative route to avoid traffic, accidents, or hazardous road conditions, movie trailer, or a book promotion.

13. A system comprising:
- memory;
- one or more processors coupled to the memory to perform acts comprising:
  - collecting location data associated with an individual;
  - extracting a plurality of locations from the location data and transforming the plurality of locations in the location data to a plurality of stay points, each stay point comprising one or more locations of the plurality of locations that define a geographical region in which the individual has stayed within a predetermined distance over a predetermined time period;
  - clustering the plurality of stay points into a sequence of stay point clusters, each stay point cluster comprising stay points corresponding to a same place or sharing a same semantic meaning within a specific distance threshold;
  - creating a location history of the individual with the sequence of stay point clusters;
  - predicting a life pattern of the individual based at least in part on the location history, the life pattern emphasizing places significant to the individual and ignoring transitions between the significant places;
  - generating a life associate rule based on the life pattern, the life associate rule comprising a rule describing a relationship between two non-conditional life patterns and a support value representing a probability of co-occurrence of the two non-conditional life patterns; and
  - providing information to the individual based at least in part on the life pattern or the life associate rule.

14. The system of claim 13, wherein collecting the location data comprises collecting global positioning system (GPS) logs and converting the GPS logs according to a time series into a GPS trajectory for the individual.

15. The system of claim 13, wherein collecting the location data comprise collecting global position system (GPS) logs of a sequence of GPS points, each GPS point contains a longitude, a latitude, and a timestamp.

16. The system of claim 13, wherein the clustering further comprises building a location history tree, the location history tree comprising a plurality of nodes in a plurality of levels, each node representing a cluster of a subset of the plurality of stay points and each level in the tree representing a geospatial granularity which is different from the rest of the plurality of levels.

17. The system of claim 13, wherein the location history comprises a place visited or stayed for a period of time, a timestamp for arrival at the place visited, and a timestamp for departure from the place visited.

18. The system of claim 13, wherein the providing the information comprises recommending at least one of advertisements, sales promotions, schedule times for public transportation, a route arrangement for travel, an alternative route to avoid traffic, accidents, or hazardous road conditions, movie trailer, or a book promotion.

* * * * *